(12) United States Patent
Sasaki

(10) Patent No.: US 11,263,046 B2
(45) Date of Patent: Mar. 1, 2022

(54) SEMICONDUCTOR DEVICE

(71) Applicant: RENESAS ELECTRONICS CORPORATION, Tokyo (JP)

(72) Inventor: Yasuo Sasaki, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 208 days.

(21) Appl. No.: 16/576,468

(22) Filed: Sep. 19, 2019

(65) Prior Publication Data
US 2020/0133727 A1 Apr. 30, 2020

(30) Foreign Application Priority Data
Oct. 31, 2018 (JP) .............................. JP2018-205514

(51) Int. Cl.
| | |
|---|---|
| *G06F 9/46* | (2006.01) |
| *G06F 9/52* | (2006.01) |
| *G06F 13/00* | (2006.01) |
| *G06F 9/48* | (2006.01) |
| *G06F 9/38* | (2018.01) |
| *G06F 9/30* | (2018.01) |
(Continued)

(52) U.S. Cl.
CPC ........ *G06F 9/4887* (2013.01); *G06F 9/30123* (2013.01); *G06F 9/3836* (2013.01); *G06F 9/3877* (2013.01); *G06F 9/4806* (2013.01); *G06F 9/4881* (2013.01); *G06F 9/5038* (2013.01); *G06F 9/5083* (2013.01); *G06F 9/52* (2013.01); *G06F 13/1605* (2013.01)

(58) Field of Classification Search
CPC .. G06F 9/4887; G06F 9/30123; G06F 9/3836; G06F 9/4881; G06F 9/4806; G06F 9/4843; G06F 9/485; G06F 9/4856; G06F 9/5083; G06F 9/5088; G06F 9/5038; G06F 9/3877; G06F 9/345; G06F 9/35; G06F 9/355; G06F 9/3824; G06F 13/1605; G06F 9/52; G06F 9/522
USPC ........................... 712/31, 225; 718/102–108
See application file for complete search history.

(56) References Cited

U.S. PATENT DOCUMENTS 8,082,378 B1* 12/2011 Pritchard .............. G06F 13/374
710/110
2004/0139441 A1 7/2004 Kaburaki et al.
(Continued)

FOREIGN PATENT DOCUMENTS

| JP | 2002-049497 A | 2/2002 |
| JP | 2004-220093 A | 8/2004 |
| WO | 2008/023426 A1 | 2/2008 |

*Primary Examiner* — Daniel H Pan
(74) *Attorney, Agent, or Firm* — McDermott Will & Emery LLP

(57) ABSTRACT

A semiconductor device capable of executing a plurality of tasks in real time and improving performances is provided. The semiconductor device comprises a plurality of processors and a plurality of DMA controllers as master, a plurality of memory ways as slave, and a real-time schedule unit for controlling the plurality of masters such that the plurality of tasks are executed in real time. The real-time schedule unit RTSD uses the memory access monitor circuit and the data determination register to determine whether or not the input data of the task has been determined, and causes the task determined to have the input data determined to have been determined to be executed preferentially.

11 Claims, 18 Drawing Sheets

(51) Int. Cl.
  *G06F 9/50* (2006.01)
  *G06F 13/16* (2006.01)

(56) References Cited

U.S. PATENT DOCUMENTS

| | | | | |
|---|---|---|---|---|
| 2006/0230408 | A1* | 10/2006 | Frigo | G06F 9/461 |
| | | | | 718/108 |
| 2008/0195843 | A1* | 8/2008 | Muniandy | G06T 15/08 |
| | | | | 712/31 |
| 2017/0293980 | A1* | 10/2017 | Phillips | G06Q 40/04 |
| 2017/0329629 | A1 | 11/2017 | Maruyama | |
| 2018/0004835 | A1* | 1/2018 | Piechowicz | G06F 16/20 |

\* cited by examiner

FIG. 2

| Address area | | | | | |
|---|---|---|---|---|---|
| 3FFFFH ⋮ 30000H | BK3-W3 | BK3-W2 | BK3-W1 | BK3-W0 | BK3 |
| 2FFFFH ⋮ 20000H | BK2-W3 | BK2-W2 | BK2-W1 | BK2-W0 | BK2 |
| 1FFFFH ⋮ 10000H | BK1-W3 | BK1-W2 | BK1-W1 | BK1-W0 | BK1 |
| 0FFFFH ⋮ 00000H | BK0-W3 | BK0-W2 | BK0-W1 | BK0-W0 | BK0 |
| | C00H (+3KB) | +800H (+2KB) | +400H (+1KB) | +000H (+0) | |

FIG. 5B

| REGISTER NAME | TIMING CONSTRAINT NAME | CONTENT OF TIMING CONSTRAINT |
|---|---|---|
| TIMING CONSTRAINT SETTING REGISTER 1 | TIMING CONSTRAINT 1 | DO NOT GENERATE "SYNC0 EVENT" DURING EXECUTION OF "BUFFER COPY + OUTPUT OPERATION". |
| TIMING CONSTRAINT SETTING REGISTER 2 | TIMING CONSTRAINT 2 | DO NOT GENERATE "TRANSMISSION/RECEPTION START EVENT" DURING EXECUTION OF "INPUT OPERATION + BUFFER COPY" |
| TIMING CONSTRAINT SETTING REGISTER 3 | TIMING CONSTRAINT 3 | DO NOT GENERATE "TRANSMISSION/RECEPTION START EVENT" DURING A PERIOD OF TIME FROM START TIME OF "BUFFER COPY + OUTPUT OPETAION" TO END TIME OF "INPUT OPERATION + BUFFER COPY". |
| TIMING CONSTRAINT SETTING REGISTER 4 | TIMING CONSTRAINT 4 | DO NOT GENERATE "TRANSMISSION/RECEPTION END EVENT" DURING PERIOD OF TIME FROM START TIME OF "BUFFER COPY + OUTPUT OPETAION" TO END TIME OF "INPUT OPERATION + BUFFER COPY". |
| ... | ... | ... |
| TIMING CONSTRAINT SETTING REGISTER n (n is a natural number.) | (UNDEFINED) | (UNDEFINED) |

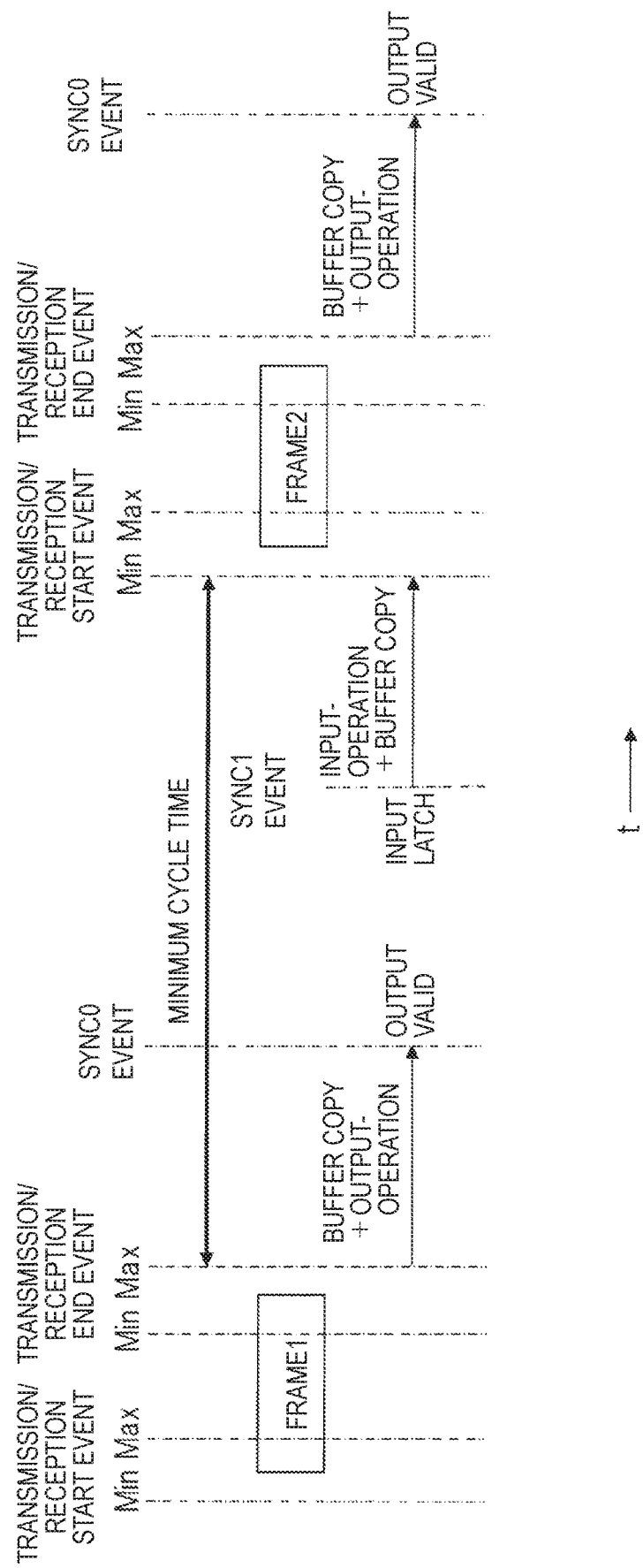

FIG. 9

| DATA SIZE | RECEIVED DATA BLOCK1 | RECEIVED DATA BLOCK2 | RECEIVED DATA BLOCK3 | RECEIVED DATA BLOCK4 |
|---|---|---|---|---|
| RECEIVED DATA | 1024 | 1024 | 1024 | 1024 |
| (1) OUTPUT DATA BY BUFFER COPY PROCESS | 1024 | 1024 | 1024 | 1024 |
| (2) OUTPUT DATA BY DATA DECOMPRESSION PROCESS | 2560 | 1536 | 1024 | 2048 |
| (3) OUTPUT DATA BY OPERATION PROCESS | 2560 | 1536 | 1024 | 2048 |

UNIT = BYTE

FIG. 11A

| CONDITION | START TARGET TASK | TASK START CONDITION |
|---|---|---|
| TSCR_1 { ADD_1 | (2) DATA DECOMPRESSION TASK DDT | DETECT WRITE TRANSFER FROM MASTER CONTROLLED BY (1) BUFFER COPY TASK TO CONTIGOUS 1024 BYTE AREA FROM ADDRESS INDICATED BY TASK START CONTROL POINTER TSSP_1 |
| TSCR_3 { ADD_3 | (3) DATA OPERATION TASK DAT | DETECT WRITE TRANSFER FROM MASTER CONTROLLED BY DATA DECOMPRESSION TASK TO CONTIGOUS 1024 BYTE AREA FROM ADDRESS INDICATED BY TASK START CONTROL POINTER TSSP_3 |
| ... | ... | ... |

TSCR

FIG. 11B

| CONDITION | ASSOCIATED TASK | SETTING CONTENT |
|---|---|---|
| SAD_1 | (2) DATA DECOMPRESSION TASK DDT | HEAD ADDRESS OF AREA READ BY MASTER CONTROLLED BY (2) DATA DECOMPRESSION TASK |
| SAD_2 | (2) DATA DECOMPRESSION TASK DDT | HEAD ADDRESS OF AREA WRITTEN BY MASTER CONTROLLED BY (2) DATA DECOMPRESSION TASK |
| SAD_3 | (3) DATA OPERATION TASK DAT | HEAD ADDRESS OF AREA READ BY MASTER CONTROLLED BY (3) DATA OPERATION TASK |
| SAD_4 | (3) DATA OPERATION TASK DAT | HEAD ADDRESS OF AREA WRITTEN BY MASTER CONTROLLED BY (3) DATA OPERATION TASK |
| ... | ... | ... |

TSSP_1, TSSP_2, TSSP_3, TSSP_4 → TSSP

FIG. 11C

| CONDITION | TEMPORARY STOP TARGET TASK | TEMPORARY STOP CONDITION |
|---|---|---|
| TTSR_1 { ADS_1 | (2) DATA DECOMPRESSION TASK DDT | DATA SIZE OF AREA NOT READ BY MASTER CONTROLLED TASKS OTHER THAN (2) DATA DECOMPRESSION TASK EXCEEDS PREDETERMINED THRESHOLD (e.g. 4096 BYTES) WITH RESPECT TO ADDRESS AREA WRITTEN BY (2) DATA DECOMPRESSION TASK |
| TTSR_2 { ADS_2 | (3) DATA OPERATION TASK DAT | DATA SIZE OF AREA NOT READ BY MASTER CONTROLLED TASKS OTHER THAN (2) DATA OPERATION TASK EXCEEDS PREDETERMINED THRESHOLD (e.g. 4096 BYTES) WITH RESPECT TO ADDRESS AREA WRITTEN BY (2) DATA OPERATION TASK |

TTSR

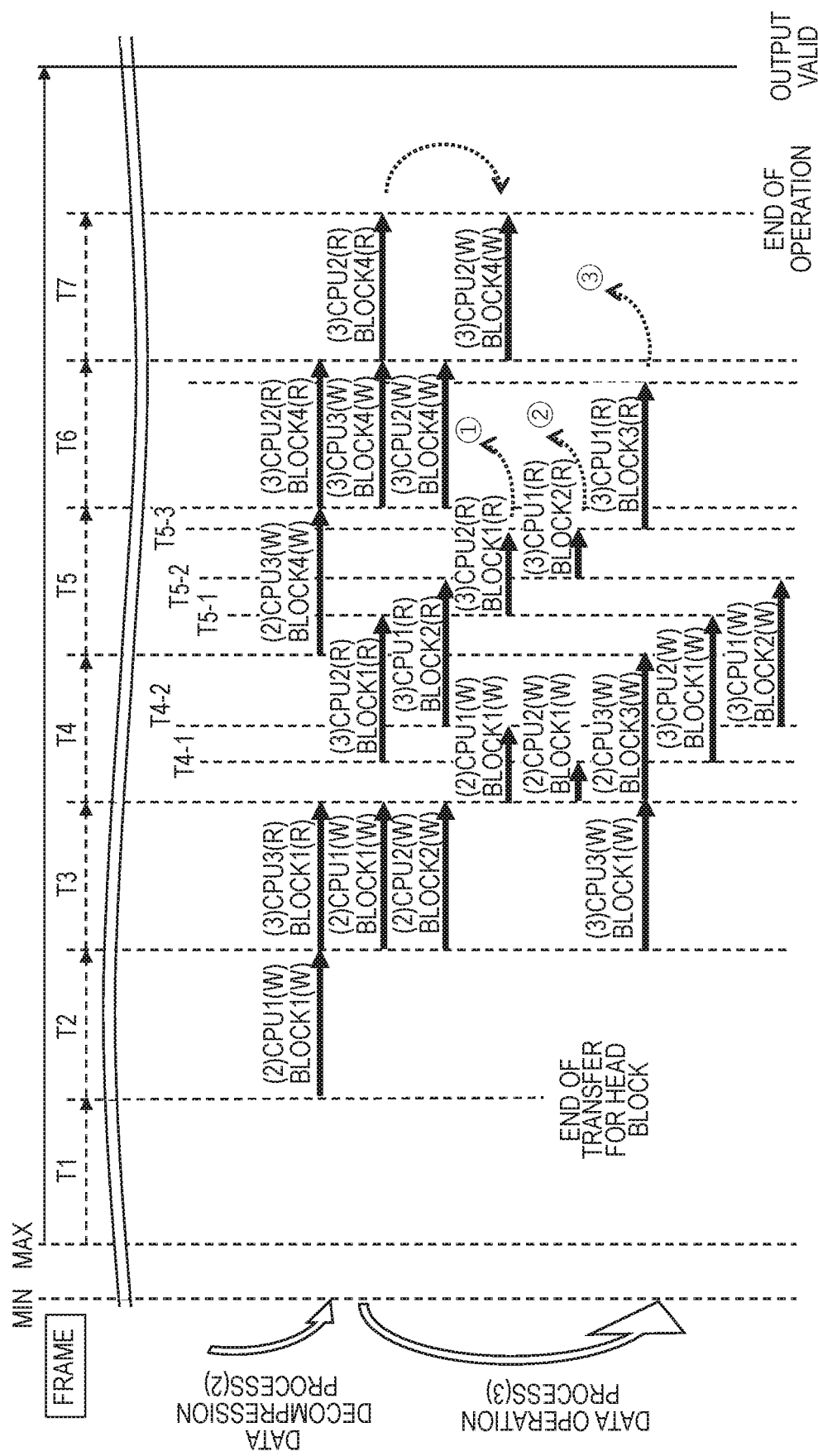

FIG. 12C
COMMUNICATION BUFFER 0
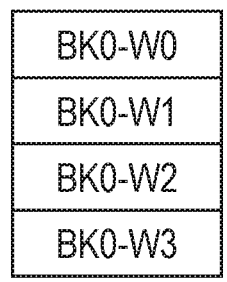
OPERATION BUFFER 1
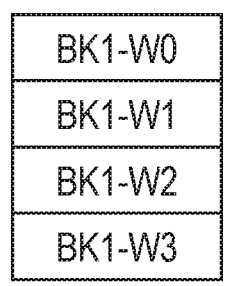
OPERATION BUFFER 2
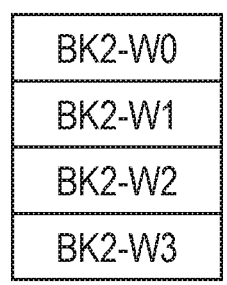
OPERATION BUFFER 3

SEMICONDUCTOR DEVICE

CROSS-REFERENCE TO RELATED APPLICATIONS

The disclosure of Japanese Patent Application No. 2018-205514 filed on Oct. 31, 2018 including the specification, drawings and abstract is incorporated herein by reference in its entirety.

BACKGROUND

The present invention relates to a semiconductor device, and more particularly to a semiconductor device comprising a plurality of masters and capable of performing a plurality of tasks in real time.

As a semiconductor device, a semiconductor device including a microprocessor (hereinafter, also simply referred to as a processor), a direct memory access controller (hereinafter, also referred to as a DMA controller), and memory circuits is known. Such a semiconductor device is used, for example, in a network system for FA (Factory Automation). When the processor executes a predetermined process according to a program, the processor outputs signals for transmitting address information and/or transfer control information (hereinafter, collectively referred to as an address signal), and accesses a memory circuit or a peripheral circuit. Like the processor, the DMA controller outputs address signals to access a memory circuit or a peripheral circuit. In this case, the processor and the DMA controller can be considered as a master that accesses the memory circuit and the peripheral circuit, and the accessed memory circuit or the peripheral circuit can be considered as a slave.

For example, in a network system, it is desired to improve the performance of the entire system while suppressing power consumption. Hereinafter, in this specification, both the real-time performance which is the ability to respond to more stringent timing constraints and the throughput performance which is data transfer rate and computation capability are collectively referred to as performance. As an effective measure for this purpose, it is considered that the number of processors and/or DMA controllers mounted on one semiconductor device is increased, and the processes are operated in parallel in real time.

Techniques relating to real time operation are described in, for example, Japanese unexamined Patent Application publication No. 2002-49497 (Patent Document 1), Japanese unexamined Patent Application publication No. 2004-220093 (Patent Document 2) and International Application publication No. WO 2008/023426 (Patent Document 3).

SUMMARY

In order to perform a plurality of processes in real time, a real-time operating system (hereinafter also referred to as a RTOS) is executed by a processor, and application programs (hereinafter also simply referred to as applications) corresponding to the processes are executed on a RTOS. In this instance, the application is divided into a plurality of tasks, and the application is executed by executing the plurality of tasks while switching the tasks by the RTOS. For RTOS, task switching (task switch) takes time. As a technique for increasing the speed of the task switch, for example, as described in Patent Document 3, there is a hardware RTOS (hereinafter, also referred to as a HW-RTOS) which realizes RTOS by hardware.

The inventors of the present invention have studied methods for shortening the task switch time by employing the HW-RTOS, improving the real-time performance, and further improving the real-time performance from a viewpoint other than the task switch.

A task may be executed once its input data is determined. However, a task scheduler that performs task scheduling cannot preferentially execute a task for which input data has been determined when it is difficult to predict the order of determination of input data in a plurality of tasks. As a result, the performance of the entire system is degraded.

Patent Document 1 describes a method of interrupting the processing of a task and switching the task when a predetermined time has elapsed, and a method of switching the task by interrupting the processing by itself, for example, triggered by a frame break. In either of these methods, it is necessary to suspend the task of inputting and outputting data in order to evaluate the current state of the input/output systems of a plurality of processes for each task. The occurrence of the interruption time causes a decrease of the real-time performance.

Patent Document 2 discloses a technique in which a FIFO (First In First Out) type storage unit is provided in an input/output unit of data, and data is supplied to tasks via a FIFO type storage unit. The FIFO type storage means sequentially fetch the data in the input order of the data. When the FIFO type storage means is used as the input/output unit of the data, the tasks cannot directly read the input data in a random order and/or directly write the output data in a random order. For example, when the input/output data must be compressed/decompressed in a certain task, the data stored in the FIFO type storage means must be copied to a memory area which can be accessed randomly separately, then the data must be compressed/decompressed, and the output data must be stored in the FIFO type storage means. The occurrence of these copy times results in a decrease of real-time performance.

Other objects and novel features will become apparent from the description of this specification and the accompanying drawings.

The semiconductor device according to one embodiment comprises a plurality of masters, slaves, and a real-time schedule unit connected to the plurality of masters and controlling the plurality of masters such that the plurality of tasks are executed in real time. The real-time schedule unit monitors whether or not input data required by a task has been decided, and preferentially executes a task for which it is decided that input data has been decided.

In one embodiment, a semiconductor device capable of executing a plurality of tasks in real time and improving performances can be provided.

BRIEF DESCRIPTION OF THE DRAWINGS

FIG. 2 is a diagram showing an address area of a memory circuit formed in a semiconductor device related to first embodiment;

FIGS. 8A and 8B are timing diagrams for explaining the operation at the time of parallel startup related to first embodiment;

FIG. 9 is a diagram for explaining the operation of semiconductor device related to the first embodiment;

FIGS. 11A to 11C are diagrams showing the structure of the data determination related to the first embodiment; and FIGS. 12A to 12C are diagrams for explaining the operation of the semiconductor device according to the embodiment.

DETAILED DESCRIPTION

Figure 1:
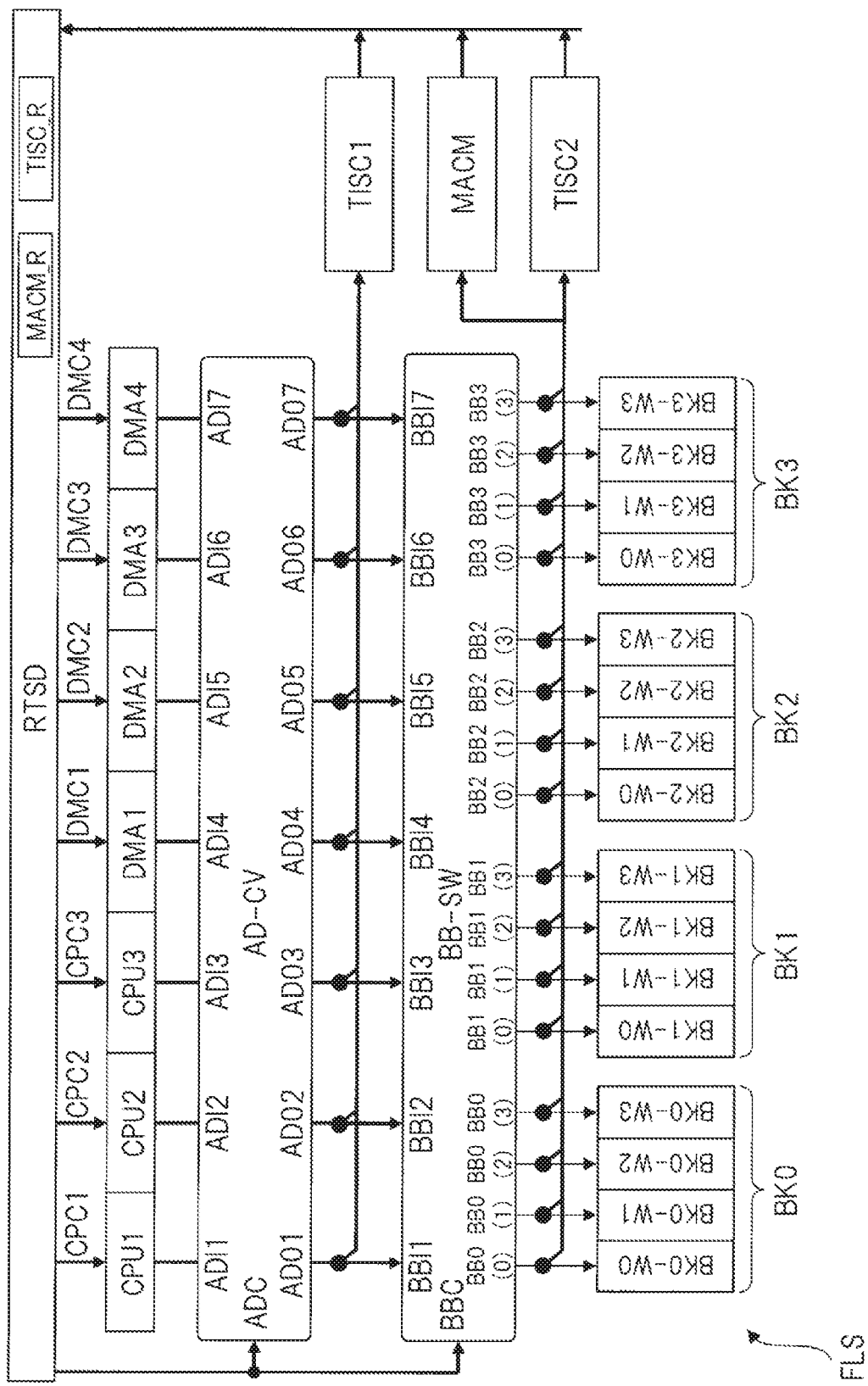
FIG. 1 is a diagram showing the configuration of the semiconductor device related to first embodiment.

In all the drawings for explaining the embodiments, the same portions are denoted by the same reference numerals in principle, and repetitive descriptions thereof are omitted in principle.

First Embodiment

Configuration of a Semiconductor Device

FIG. 1 is a diagram showing the configuration of a semiconductor device related to first embodiment. In FIG. 1, FLS denotes semiconductor device. The semiconductor device FLS is a semiconductor device constituting a network system (not shown) although the network system is not particularly limited. Although the network system is composed of a plurality of semiconductor device and the like, only semiconductor device FLS required for explanation are shown here. The semiconductor device FLS has a function of transmitting and receiving frames in a network system.

For example, the semiconductor device FLS has a function of receiving a frame, performing predetermined calculation and predetermined processing on the received frame, and transmitting the frame on which the calculation and processing are performed.

The semiconductor device FLS includes a plurality of circuit blocks formed on one semiconductor substrate, but only the circuit blocks required for explanation are depicted in FIG. 1. In FIG. 1, CPU1~CPU3 each denotes a processor, and DMA1~DMA4 each denotes a DMA controller. A real-time schedule unit RTSD, an address converter AD-CV, a bus switch circuit BB-SW, and a bank memory BK0~BK3 configured by a memory circuit (not shown) are shown in FIG. 1.

In FIG. 1, a first transfer information acquisition circuit TISC1, a second transfer information acquisition circuit TISC2, and a memory access monitor circuit MACM are shown. In FIG. 1, the real-time schedule unit RTSD includes a timing constraint register TISC_R used when the real-time schedule unit RTSD performs processes using the first transfer information acquisition circuit TISC1 and the second transfer information acquisition circuit TISC2. Similarly, a data-determination register MACM_R in the real-time schedule unit RTSD is used when the real-time schedule RTSD performs a process using the memory access monitor circuits MACM. Although the real-time schedule unit RTSD includes the timing constraint register TISC_R and the data determination register MACM_R, the present invention is not limited to this, and these registers may be provided in the semiconductor device FLS.

The real-time schedule unit RTSD has hardware RTOS functions. That is, as described in Patent Document 3, the real-time schedule unit RTSD of the present invention has a RTOS function constituted by hardware. The real-time schedule unit RTSD is coupled to the processor CPU1~CPU3 and the DMA controller DMA1~DMA4 and controls these processors and DMA controllers. In FIG. 1, the control of the processor CPU1~CPU3 by the real-time schedule unit RTSD is shown schematically by the symbol CPC1~CPC3. Likewise, the control of the DMA-controller DMA1~DMA4 by the real-time schedule unit RTSD is represented schematically by the symbol DMC1~DMC4.

The real-time schedule unit RTSD assigns tasks to each processor CPU1~CPU3 and controls the processors to perform the assigned tasks. The real-time schedule unit RTSD also controls the assignment of DMA-controller DMA1~DMA4 as required when performing tasks. Each processor CPU1~CPU3 transfers data using the assigned DMA controllers to perform the assigned tasks.

The address converter AD-CV includes input terminals ADI1~ADI7, output terminals ADO1~ADO7, and a control terminal ADC. The address signals output from the corresponding processor CPU1~CPU3 are supplied to the input terminals ADI1~ADI3, and the address signals output from the corresponding DMA-controllers DMA1~DMA4 are supplied to the input terminals ADI4~ADI7. The address signals supplied to the input terminal ADI1~ADI7 is converted and the converted address signals are output from the corresponding output terminals ADO1~ADO7. For example, address signals from the processor CPU1 supplied to the input terminal ADI1 are converted and output from the corresponding output terminal ADO1. Similarly, address signals from the DMA controller DMA1 supplied to the input terminal ADI4 are converted and output from the corresponding output terminal ADO4.

A control signal is supplied to the control terminal ADC from the real-time schedule unit RTSD, and the address converter AD-CV operates in accordance with the control signal. The control signal includes, for example, conversion information used for conversion. In accordance with the conversion information supplied from the real-time schedule unit RTSD, the address converter AD-CV converts the address signals supplied to the input terminal and outputs the converted address signals from the output terminal.

The bus switch circuit BB-SW includes input terminals BBI1~BBI7, output terminals BB0(0) to BB0(3), BB1(0) to BB1(3), BB2(0) to BB2(3), BB3(0) to BB3(3), and a control terminal BBC. The input terminals BBI1~BBI7 are each coupled to a corresponding output terminals ADO1~ADO7 of the address converter AD-CV, and the output terminals are connected to the bank memory BK0~BK3. The control terminal BBC is connected to the real-time schedule unit RTSD. The real-time schedule unit RTSD supplies a selection signal to the control terminal BBC, so that the bus switch circuit BB-SW electrically connects the input terminals and the output terminals specified by the supplied selection signal to each other. For example, the input terminals BBI1~BBI3 are electrically connected to the output terminals BB0(0) to BB0(2) and the input terminals BBI4~BBI7 are electrically connected to the output terminals BB1(0) to BB1(3) in accordance with the selection signals supplied to the control terminal BBC. Although an example has been described, the input terminals and the output terminals which are electrically connected to each other are determined by the selection signal supplied to the control terminal BBC. The bus switch circuit BB-SW includes data input terminals and data output terminals for transferring data bidirectionally between the master and the slave, i.e., in the same direction as the address signal at the time of writing, and in the opposite direction to the address signal at the time of reading, but are omitted in the drawing. Similarly, the bus switch circuit BB-SW includes a terminal for inputting and outputting a transfer control signal in a direction opposite to the address signal, but are omitted in the drawing.

In the first embodiment, address signals outputted from the three processors CPU1~CPU3 functioning and the four DMA controllers DMA1~DMA4 as masters are converted by the address converter AD-CV and supplied to the input terminals of the bus switch circuit BB-SW. An address signal converted by this address conversion (hereinafter also referred to as a converted address signal) is supplied to an output terminal designated by a selection signal supplied to the control terminal BBC, among the output terminals BB0(0) to BB0(3), BB1(0) to BB1(3), BB2(0) to BB2(3), and BB3(0) to BB3(3).

The bank memories BK0~BK3 is accessed based on the converted address signal supplied from the bus switch circuit BB-SW, and data is written/read to/from the address specified by the converted address signal. That is, the bank memories BK0~BK3 function as a slave.

The bank memories BK0~BK3 are arranged in consecutive addressing areas, though not particularly limited. Each of the bank memories BK0~BK3 is configured by four memory ways, although not particularly limited thereto. That is, the bank memory BK0 is configured by four memory ways BK0~W0~BK0~W3, and the bank memory BK1 is configured by a memory way BK1~W0~BK1~W3. Similarly, the bank memory BK2 is configured by the memory way BK2~W0~BK2~W3, and the bank memory BK3 is configured by the memory way BK3~W0~BK3~W3. As will be described later in detail with reference to FIG. 2, the four memory ways in the bank memory have address regions obtained by dividing the address regions of the bank memory, and have address regions different from each other.

The output terminals BB0(0) to BB0(3) of the bus switch circuit BB-SW are connected to the memory way BK0~W0~BK0~W3, and the output terminals BB1(0) to BB1(3) are connected to the memory way BK1~W0~BK1~W3. Similarly, the output terminals BB2(0) to BB2(3) of the bus switch circuit BB-SW are connected to the memory way BK2~W0~BK2-W3, and the output terminals BB3(0) to BB3(3) are connected to the memory way BK3-W0~BK3~W3. The address signals outputted from the processor and the DMA controller are converted into the converted address signals, and then supplied to the memory way designated by the selection signal of the real-time schedule unit RTSD, and a write or read operation is performed on the address in the memory way.

The bus switch circuits BB-SW selectively connect seven masters (CPU0~CPU3 and DMA1~DMA4) and sixteen slaves (memory ways BK0~W0~BK3~W3). At this time, since the bus switch circuit BB-SW connects a plurality of masters and a plurality of slaves simultaneously, the bus switch circuit BB-SW can be considered to constitute a bus system having a multi-layer matrix configuration.

The first transfer information acquisition circuit TISC1 is connected to the input terminals BBI1~BBI7 of the bus switch circuit BB-SW, and obtains the number of cycles on the basis of the converted address signals (address information and/or transfer control information) at each input terminals BBI1~BBI7. That is, the first transfer information acquisition circuit TISC1 obtains the number of cycles when the processors CPU1~CPU3 and the DMA controllers DMA1~DMA4 respectively access the memory ways by the converted address signals. The acquired number of cycles is supplied to the real-time schedule unit RTSDRTSD.

The second transfer information acquisition circuit TISC2 is connected to the output terminals BB0(0) to BB0(3), BB1(0) to BB1(3), BB2(0) to BB2(3), and BB3(0) to BB3(3) of the bus switch circuit BB-SW. The second transfer information acquisition circuit TISC2 acquires the number of cycles based on the converted address signals (address information and/or transfer control information) at the output terminals BB0(0) to BB0(3), BB1(0) to BB1(3), BB2(0) to BB2(3), and BB3(0) to BB3(3), respectively. That is, the second transfer information acquisition circuit TISC2 acquires the number of cycles for accessing the memory way by the converted address signals outputted from the bus-switch circuit BB-SW. The acquired number of cycles is supplied to the real-time schedule unit RTSD.

The memory access monitor circuit MACM is connected to the output terminals BB0(0) to BB0(3), BB1(0) to BB1 (3), BB2(0) to BB2(3), and BB3(0) to BB3(3) of the bus switch circuit BB-SW. The memory access monitor circuit MACM acquires the converted address signals at the output terminals BB0(0) to BB0(3), BB1(0) to BB1(3), BB2(0) to BB2(3), and BB3(0) to BB3(3), respectively. The acquired converted address signals are supplied to the real-time schedule unit RTSD.

The real-time schedule unit RTSD acquires the number of cycles of accessing the same slave (memory way) from a plurality of masters in the same time zone (the same time period) based on the number of cycles supplied from the first transfer information acquisition circuit TISC1 and the second transfer information acquisition circuit TISC2. That is, the number of cycles when an access conflict occurs is acquired as the number of access cycles. The bus switch circuit BB-SW can electrically connect an arbitrary plurality of input terminals and an arbitrary plurality of output terminals at the same time.

For example, it is assumed that the processor CPU1 and the DMA controller DMA1 simultaneously access the memory way BK1-W0. In this instance, the first transfer information acquisition circuit TISC1 acquires the number of cycles from changes in the converted address signals (address information and/or transfer control information) at the output terminals ADO1 and ADO4.

In this first embodiment, the second transfer information acquisition circuit TISC2 acquires the number of cycles from the change of the converted address signal (address information and/or transfer control information) at the output terminal BB1(0). The real-time schedule unit RTSD determines that a plurality (two) of masters are accessing based on the number of cycles of two (input terminals BBI1 and BBI4) supplied from the first transfer-information acquisition circuit TISC1. At this time, since the number of cycles supplied from the second transfer information acquisition circuit TISC2 is one (output terminal BB1(0)), the real-time schedule unit RTSD can determine that an access conflict has occurred in the access to the memory way BK1-W0. The number of access conflict cycles can be determined based on the number of cycles supplied from each of the first transfer information acquisition circuit TISC1 and the second transfer information acquisition circuit TISC2.

Depending on the bus protocol specifications of the bus switching circuit BB-SW, it may be possible to acquire the number of access cycles when an access conflict occurs by using only one of the first transfer information acquisition circuit TISC1 and the second transfer information acquisition circuit TISC2, and in this instance, it is possible to remove one of the first transfer information acquisition circuit TISC1 and the second transfer information acquisition circuit TISC2.

Although the case where the accesses from the two masters to the memory way BK1-W0 conflict has been described, the real-time schedule unit RTSD can acquire the number of cycles (the number of access cycles) of the access conflict to the same slave in the same manner as in the case where the accesses of the plurality of masters compete to the same slave.

The tasks that make up the application are assigned to the processor CPU1~CPU3 by the real-time schedule unit RTSD. The real-time schedule unit RTSD assigns one of the DMA controllers DMA1~DMA4 to a task when the real-time scheduling RTSD uses a DMA controller in the task. Each processor CPU1~CPU3 executes assigned tasks, thereby executing an application.

In executing the tasks, the processor CPU1~CPU3 and/or the DMA-controllers DMA1~DMA4 accesses the slaves, i.e., the memory ways BK0(0)-W0 to BK3(3)-W3, and writes and/or reads data to and from the memory ways for use in, e.g., arithmetic operations. If a plurality of masters (processors and/or DMA controllers) access the same slave (memory ways) in the same time zone, the real-time schedule unit RTSD acquires the number of access conflict cycles based on the number of cycles from the first transfer information acquisition circuit TISC1 and the second transfer information acquisition circuit TISC2.

The real-time schedule unit RTSD detects whether or not consecutive predetermined address areas starting from predetermined addresses in the bank memory BK0~BK3 are accessed based on the converted address signals supplied from the memory access monitor MACM. If it is determined that the consecutive predetermined areas of addresses have been accessed, the real-time schedule unit RTSD determines that the input data of the task has been determined, and activates the task for processing the input data.

Memory Circuit

Next, an address region of a memory circuit functioning as a slave will be described. FIG. 2 is a diagram showing an address area of a memory circuit in the semiconductor device related to first embodiment. The memory circuit has consecutive address areas.

In FIG. 2, the addresses of the memory circuits formed in the semiconductor device FLS are denoted by 00000H to 3FFFFH shown on the left side. That is, in the first embodiment, the memory circuit has consecutive address regions of addresses 00000H to 3FFFFH. In the present specification, the symbol H added to the rear side of the number indicates that the number is a hexadecimal number.

The consecutive address areas are divided into four address areas and allocated to the bank memories BK0~BK3. In FIG. 2, address area 00000H to 0FFFFH is allocated as area of the bank memory BK0, and address area 10000H to 1FFFFH is allocated as area of the bank memory BK1. Similarly, address area 20000H to 2FFFFH is allocated as area of the bank memory BK2, and address area 30000H to 3FFFFH is allocated as area of the bank memory BK3. That is, each of the bank memories BK0~BK3 has address area of 64 KB (kilobytes) which differ from each other.

Each bank memory includes four memory ways. In the first embodiment, memory ways W0, W1, W2, W3, W0, W1, W2, and W3 are repeatedly allocated to the four memory ways in units of 1 KB (kilobyte) from the each starting addresses of the bank memories. As exemplified by the bank memory BK1, the bank memory BK1 includes the memory way BK1-W0~BK1-W3, and an address area of the starting address from 10000H to 103FFH of the bank memory BK1 is allocated as an area of the memory way BK1-W0, and an address area from 10400H to 107FFH is allocated as an area of the memory way BK1-W1. Similarly, an address area from 10800H to 10BFFH is allocated as an area of the memory way BK1-W2, and an address area from 10C00H to 10FFFH is allocated as an area of the memory way BK1-W3. After the memory way BK1-W3, the process returns to the memory way BK1-W0, and the address area from 11000H to 113FFH are allocated as area of the memory way BK1-W0, and the address area from 11400H to 117FFH are allocated as area of the memory way BK1-W1. Similarly, an address area from 11800H to 11BFFH is allocated as a area of the memory way BK1-W2, and an address area from 11C00H to 11FFFH is allocated as a area of the memory way BK1-W3. Similarly, address area from 12000H to 1FFFFH are allocated to the memory way BK1-W0~BK1-W3. That is, each of the memory ways W0 to W3 has 16 consecutive address area of 1 KB.

The other bank memories are similarly configured by four memory ways, and the respective regions of the memory ways are allocated to different address areas.

Operation of the Semiconductor Device

Figure 3:
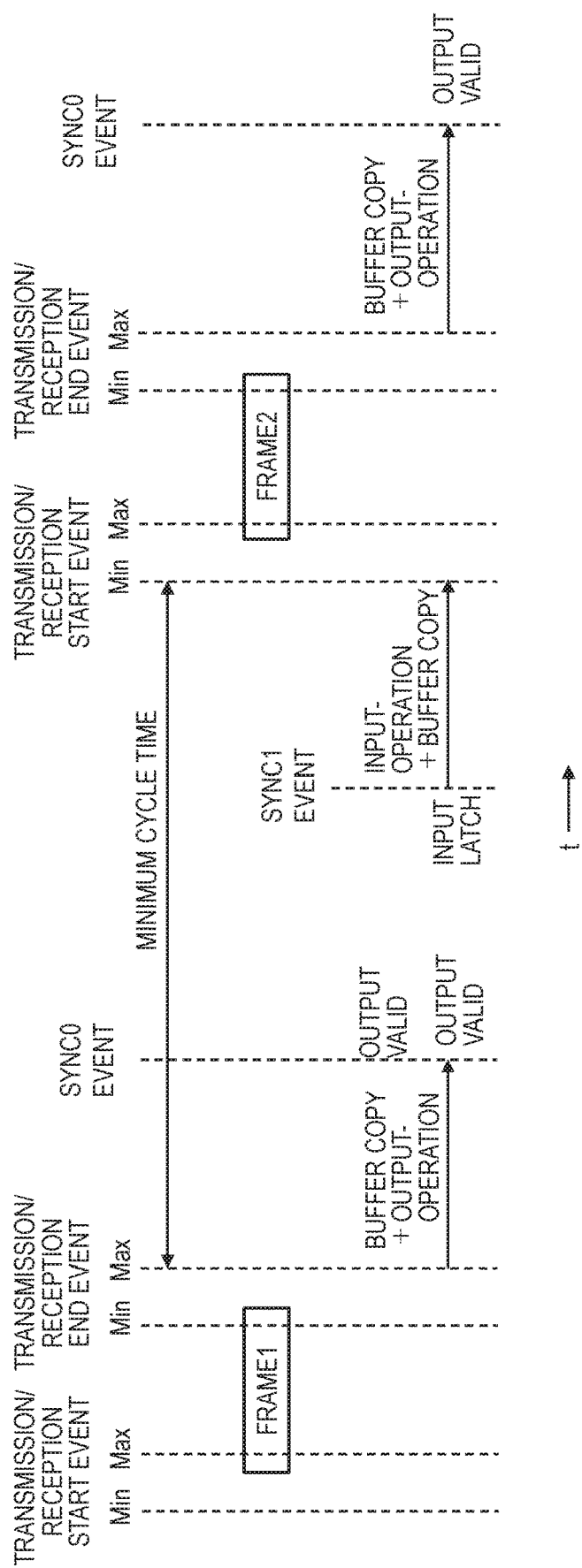
FIG. 3 is a timing diagram illustrating an outline of the operation of the semiconductor device related to the first embodiment.

Next, the operation of the semiconductor device FLS related to the first embodiment will be described. Here, as an application executed by the semiconductor device FLS, a program for performing predetermined calculations and predetermined processes on a frame received by the semiconductor device FLS and transmitting the frame on which the calculations and the processes are performed will be exemplified. It is also assumed that the data of the received frame is compressed. First, an outline of the operation will be described with reference to FIG. 3. FIG. 3 is a timing chart for explaining the outline of the operation of the semiconductor device FLS related to the first embodiment.

In FIG. 3, the horizontal axis t represents time. In FIG. 3, the transmission/reception of the frame is started at a timing between the minimum time Min and the maximum time Max of the transmission/reception start event, and the transmission/reception of the frame is completed at a timing between the minimum time Min and the maximum time Max of the transmission/reception end event. In FIG. 3, between the transmission/reception start event and the transmission/reception end event shown on the left side, a frame 1 is received by a frame receiving device (not shown) and stored in a communication buffer 0 (not shown). A predetermined calculation (output calculation) is performed using the data stored in the communication buffer 0, and the calculated data is output to the outside of the semiconductor device FLS in synchronization with the SYNC0 event. On the other hand, data input to the semiconductor device FLS in synchronization with SYNC1 event are subjected to predetermined calculation (input calculation) and stored in the communication buffers 1 (not shown). The data stored in the communication buffer 1 is converted into a frame 2 by a frame transmission device (not shown) and transmitted between the transmission/reception start event and the transmission/reception ending event shown on the right side. The transmitted frame 2 is received by an external device network-connected to the semiconductor device FLS, though not particularly limited, and a predetermined calculation is performed in the same manner as in the frame 1.

As shown in FIG. 3, the minimum cycle time allowed for this application is a period of time between the maximum time Max of the transmission/reception end event and the minimum time Min of the transmission/reception start event. The semiconductor device FLS performs a plurality of parent tasks for the application during this minimal cycle time. In FIG. 3, three parent tasks for the application are shown. That is, the first parent task is activated based on the transmission/reception end event, the second parent task is activated based on the SYNC1 event, and the third parent task is activated based on the transmission/reception end event in the same manner as the first task. Here, the first parent task is a task for copying the data stored in the communication buffer 1 to the operation buffer 1 and performing a predetermined output calculation. The second parent task is a task for performing an input calculation on data input to the semiconductor device FLS and copying the data to the communication buffer 1. The third parent task is a task for monitoring that a transmission/reception start event does not occur and that a transmission/reception end event does not occur between the start of the first parent task and the end of the second parent task.

The first parent task is required to finish executing the task during the period of time between the transmission/reception end event and the SYNC0 event. That is, the first parent task execution period is required to be the same as or shorter than the period of time between the transmission/reception end event and the sync0 event. Focusing on the timing of the sync0 event, it is necessary that the output of the first parent task is valid before the sync0 event occurs. Similarly, the second parent task execution period is required to be the same as or shorter than the time between the sync1 event and the transmission/reception start event. The third parent task execution period is required to be the same as or shorter than the period of time between the transmission/reception end event of frame 1 and the transmission/reception start event of frame 2.

If the first parent task is not completed by, for example, the sync0 event, the external device coupled to the semiconductor device FLS cannot receive the data outputted by the semiconductor device FLS in synchronization with the sync0 event, and malfunctions. Similarly, if the second parent task is not completed before the transmission/reception start event, the external device coupled to the semiconductor device FLS through network cannot receive the data inputted by the semiconductor device FLS and malfunctions. Similarly, even when the third parent task has not finished before the transmission/reception start event and/or the transmission/reception end event, the external device malfunctions. That is, the first parent task has a timing constraint 1 to complete the processing before the occurrence of the sync0 event. Similarly, the second parent task has a timing constraint 2 to complete the process before the occurrence of the transmission/reception start event. The third parent task has a timing constraint 3 indicating that a transmission/reception start event does not occur between the start of the first parent task and the end of the second parent task, and a timing constraint 4 indicating that a transmission/reception end event does not occur between the start of the first parent task and the end of the second parent task.

Figure 4:
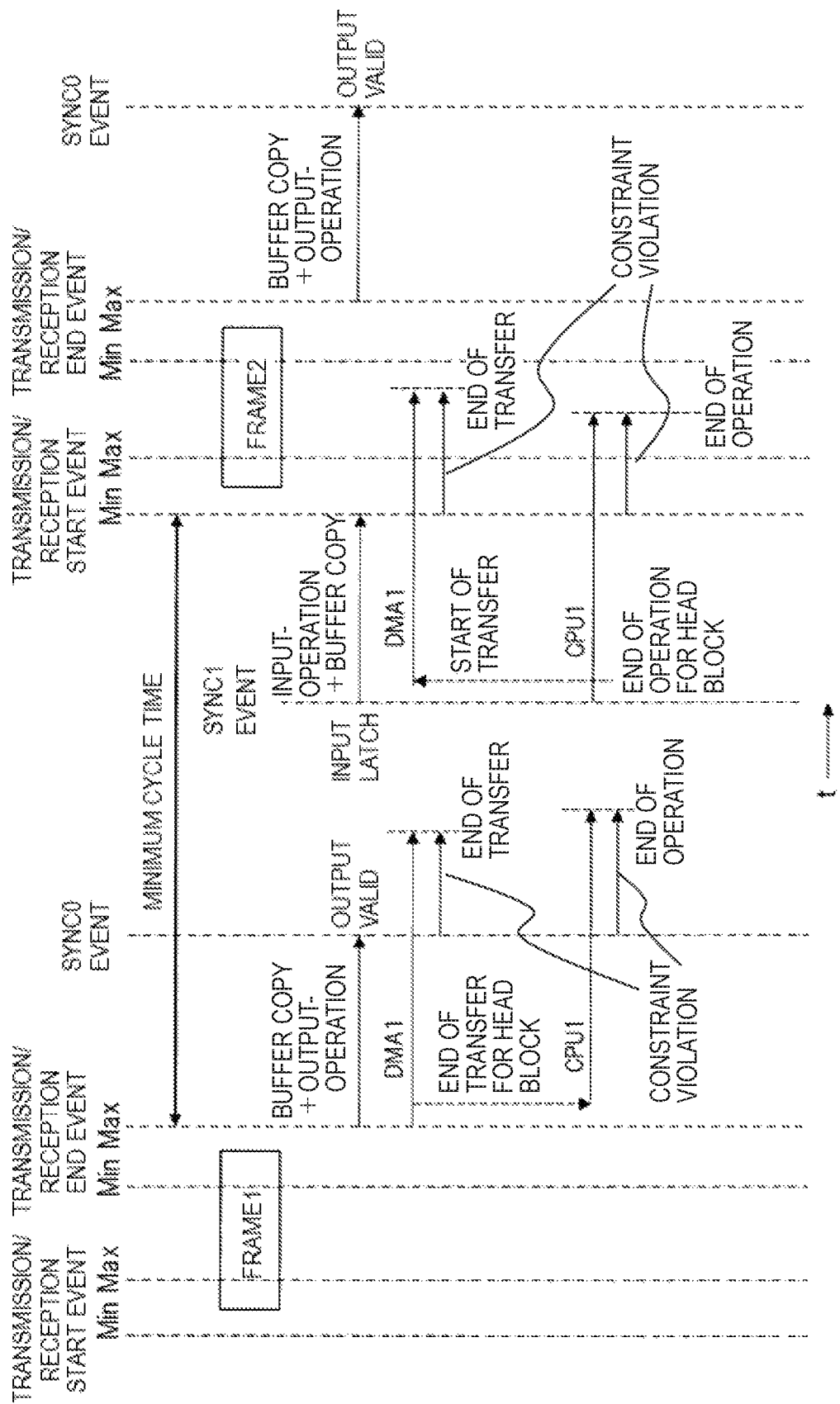
FIG. 4 is a timing diagram showing the operation of the semiconductor device related to first embodiment.

FIG. 4 is a timing diagram showing the timing of the semiconductor device related to the first embodiment in more detail. FIG. 4 shows a case where the timing constraint 1 and the timing constraint 2 described above are violated. At the timing shown in FIG. 4, the real-time schedule unit RTSD assigns the first parent task for performing "buffer copy+output operation" to the processor CPU1 and the DMA controller DMA1. Similarly, the real-time schedule unit RTSDRTSD assigns the processor CPU1 and the DMA controller DMA1 to perform the second parent task for performing the "input operation+buffer copy".

When the first parent task is activated, the DMA controller DMA1 copies the data stored in the communication buffer 1 to the operation buffer 1. When the head block of the data stored in the communication buffer 1 is transferred to the operation buffer 1, the processor CPU1 performs an operation on the head block transferred to the operation buffer 1. Thereafter, the same operation is repeated, all the blocks of the frame 1 are copied to the operation buffer 1, and the processor CPU1 completes the operation on the blocks transferred to the operation buffer 1. Until the sync0 event, when the transfer is not completed or/and the operation by the processor CPU1 is not completed, the timing constraint 1 is violated. In other words, the timing constraint 1 is not satisfied.

The data input to the semiconductor device FLS in synchronization with the sync1 event is latched and held. When the sync1 event occurs and the second parent task is activated, the processor CPU1 performs a predetermined calculation on the first blocks of the latched frame. The DMA controller DMA1 transfers (copies) the head block of the frame subjected to the predetermined calculation to the communication buffer 1. Thereafter, the same operation is repeated, the processor CPU1 performs a predetermined input calculation on all the blocks of the latched frame, and the DMA controller DMA1 transfers the block on which the predetermined input calculation has been performed to the communication buffer 1. If the end time of the calculation by the processor CPU1 or the end time of the transfer (copying) by the DMA-controller DMA1 is delayed from the transmission/reception start event, the timing constraint 2 is violated.

When a constraint violation occurs in the first parent task, it becomes difficult to output appropriate data to the external device using the result of the output calculation performed by the first parent task. When a constraint violation occurs in the second parent task, it becomes difficult to transmit an appropriate frame as the frame 2. In any of these cases, since the task processing is not completed at a predetermined timing, the external device using the data and/or the frame output by the semiconductor device FLS cannot be normally operated at the predetermined timing.

There are also the timing constraint 3 for preventing a transmission/reception start event from occurring during the period to perform the first parent task and the second parent task, that is, during the minimum cycle time from the start time of the "buffer copy+output operation" to the end time of the "input operation+buffer copy" shown in FIG. 3, and a timing constraint 4 for preventing a transmission/reception end event from occurring during the minimum cycle time.

Timing Constraint Setting Register

Figure 5:
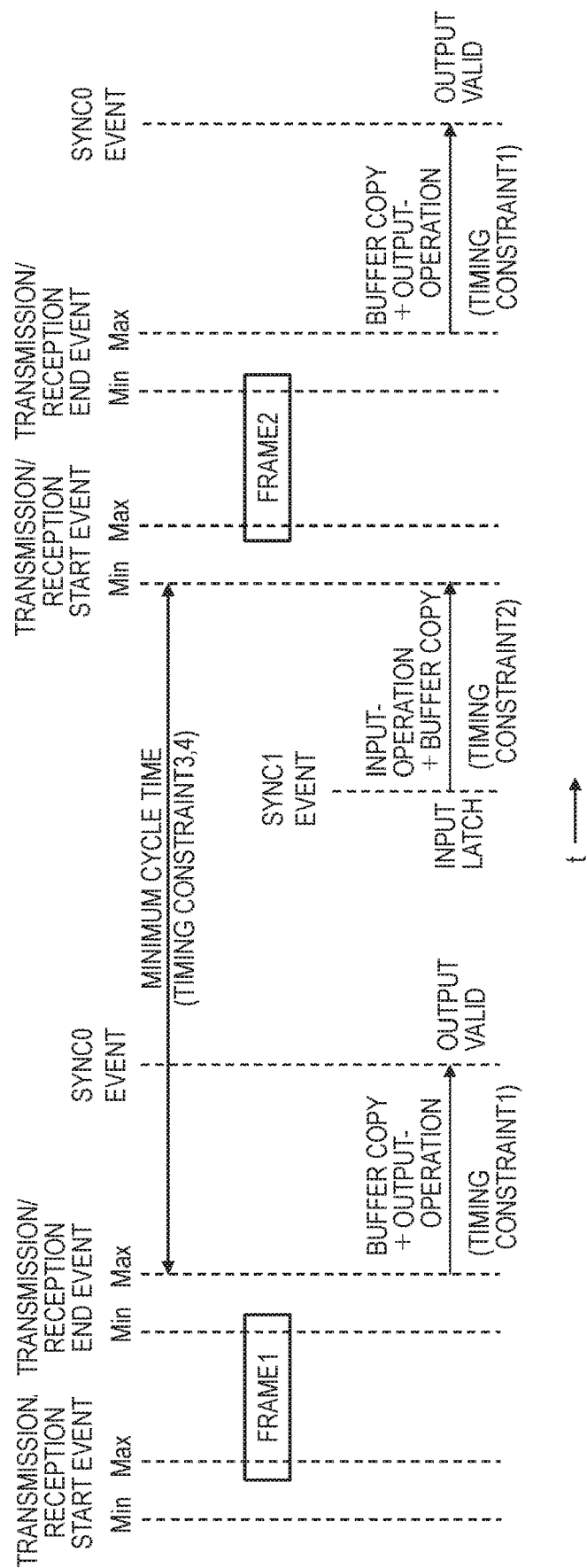
FIGS. 5A and 5B are diagrams for explaining the timing constraint setting register related to first embodiment.

The real-time schedule unit RTSD related to first embodiment includes the timing constraint setting register TISC_R as the setting register related to the timing constraint, shown in FIG. 1. FIGS. 5A and 5B are a diagram for explaining a timing-constraint setting register related to first embodiment. FIG. 5A is a timing diagram for explaining timing constraints. FIG. 5B is a diagram showing a configuration of a timing constraint setting register TISC_R included in the real-time schedule unit RTSD.

Since FIG. 5A is similar to FIG. 3, the difference will be explained. In FIG. 5A, the timing constraints 1 to 4 described above are added to the timing diagram shown in FIG. 3. As shown in FIG. 5A, the timing constraint 1 represents a timing constraint from the occurrence of the transmission/reception end event to the occurrence of the sync0 event, and the timing constraint 2 represents a timing constraint from the occurrence of the sync1 event to the occurrence of the transmission/reception start event. Timing constraints 3 and 4 represent timing constraints from the start time of the "buffer copy+output operation" to the end time of the "input operation+buffer copy".

In FIG. 1, the timing constraint setting register is shown as one block, but in particular, the real-time schedule unit RTSD includes a plurality of timing constraint setting registers. FIG. 5B shows timing constraint setting registers 1 to 4 corresponding to the timing constraints 1 to 4 and an unset timing constraint setting register n among a plurality of timing constraint setting registers. The contents of the timing constraints represented in the timing constraint setting registers 1 to 4 are as shown in FIG. 5B.

In each of the timing constraint setting registers 1 to 4, an allowable period related to the timing constraint is set. That is, in the timing constraint setting register 1, the period from the occurrence of the transmission/reception end event to the occurrence of the sync0 event, namely, the period in which the violation of the timing constraint 1 does not occur, is set as the allowable period. In the timing constraint setting register 2, a period from the occurrence of the sync1 event to the occurrence of the transmission/reception start event, namely, the period in which the violation of the timing constraint 2 does not occur, is set as an allowable period. In other words, it can be considered that the allowable execution period of the first parent task is set in the timing constraint setting register 1, and the allowable execution period of the second parent task is set in the timing constraint setting register 2.

The timing constraint setting registers 3 and 4 can also be regarded as being set with a timing constraint for monitoring that no frame is transmitted/received in a period from the start time of the "buffer copy+output operation" to the end time of the "input operation+buffer copy". The timing constraint setting registers 3 and 4 may be one register.

Though not particularly limited, in the first embodiment, the above-mentioned timing constraint setting registers 1 to 4 are a set corresponding to an application. The number of timing constraint setting registers to be set as one set is determined according to the number of parent tasks constituting the application. The real-time schedule unit RTSD is provided with the timing constraint setting registers having a set number corresponding to the number of applications to be executed.

The real-time schedule unit RTSD determines whether or not a constraint violation occurs when each of the parent tasks is executed based on the allowable periods set in the timing constraint setting registers 1 to 4. When the constraint violation occurs, the real-time schedule RTSD changes the control of the processor, the DMA controller, the address converter AD-CV, the bus switch circuit BB-SW, and/or the memory circuit. In this modification, the real-time schedule unit RTSD controls the processor, the DMA controller, the address converter AD-CV, the bus switch circuit BB-SW, and/or the memory circuit so as not to cause a constraint violation by using the access cycles of the access conflict acquired by using the first transfer information acquisition circuit TISC1 and the second transfer information acquisition circuit TISC2.

In first embodiment, the real-time schedule unit RTSDRTSD controls the processor, DMA-controller, the address converter AD-CV, bus-switch circuit BB-SW, and memory-circuit so that constraint violations do not occur by changing the number of parallel activations. Next, parallel activation will be described.

Parallel Activation

In first embodiment, the semiconductor device FLS includes three processors CPU1~CPU3 and four DMA controllers DMA1-DMA4. The semiconductor device FLS has the memory circuits as buffers for storing frames and operation data. As described above, the memory circuits include 16 memory ways BK0-W0~BK3-W3.

In the first parent task to the second parent task described above, the execution time of each parent task is shortened by operating the processors, the DMA controllers, and/or the memory ways in parallel in time.

For example, in the first parent task and the second parent task, the real-time schedule unit RTSD controls copying and arithmetic operations (output operation and input operation) of a frame using a plurality of processors, a plurality of DMA controllers, and a plurality of memory ways. As examples, two processors CPU1 and CPU2 and two DMA controllers DMA1 and DMA2 and bank memories BK0 and BK1 including eight memories are assigned to the first parent task and the second parent task, respectively. Since the two processors CPU1 and CPU2 operate temporally in parallel, the number of parallel activations is 2. Of course, this is an example, and the number of parallel activations by assignment can be arbitrarily set.

Operation of Parallel Activation

Figure 6:
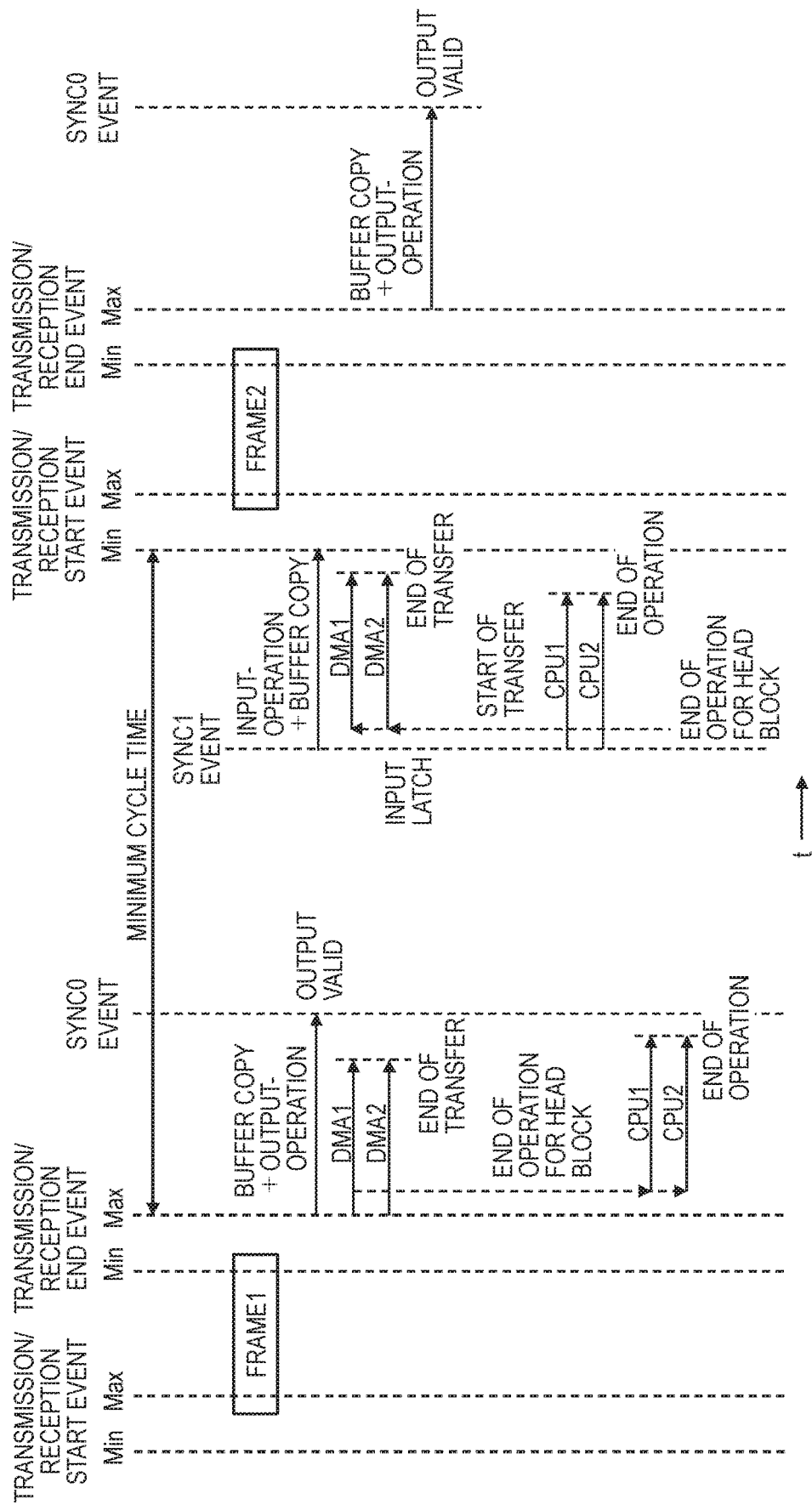
FIG. 6 is a timing diagram showing the operation when the first embodiment is started in parallel.

Next, an operation when the number of parallel activations is 2 will be described. FIG. 6 is a timing chart showing the operation of the first embodiment at the time of parallel activation. Since FIG. 6 is similar to FIG. 4, the differences will be mainly explained.

In FIG. 4, the real-time schedule unit RTSD assigns parent tasks to processor CPU1 and DMA controller DMA1. That is, the number of parallel activations is 1. In this instance, in each of the first parent task performing the processing of "buffer copy+output operation" and the second parent task performing the processing of "input operation+buffer copy", the processing of the buffer copy (transfer) of the frame 1 is performed by one DMA controller DMA1 assigned to the task, and the processing of the operation (output operation, input operation) is performed by one processor CPU1 assigned to the task.

On the other hand, in FIG. 6 in which the number of parallel activation is 2, in the first parent task performing the processing of "buffer copy+output operation", the processing of buffer copy (transfer) of frame 1 is performed in parallel by the DMA controllers DMA1 and DMA2 assigned to this task. In the first parent task, the process of the output operation is also performed in parallel by the processors CPU1 and CPU2 assigned to the first parent task. Similarly, in the second parent task performing the processing of "input operation+buffer copy", the processing of the input operation is performed in parallel by the processors CPU1 and CPU2, and the processing of the buffer copy (transfer) of the input operation result (frame) is also performed in parallel by the DMA controllers DMA1 and DMA2.

Since the processing is performed in parallel, it is possible to shorten the time required for the processing of the buffer copy (transfer) and the processing of the operation (output operation, input operation). As a result, before the sync0 event occurs, the processing of "buffer copy+output operation" can be terminated by the first parent task. Similarly, before the transmission/reception start event occurs, the second parent task can terminate the processing of "input operation+buffer copy". That is, the application can be executed without violating the timing constraint 1 of the first parent task and the timing constraint 2 of the second parent task.

Figure 7:
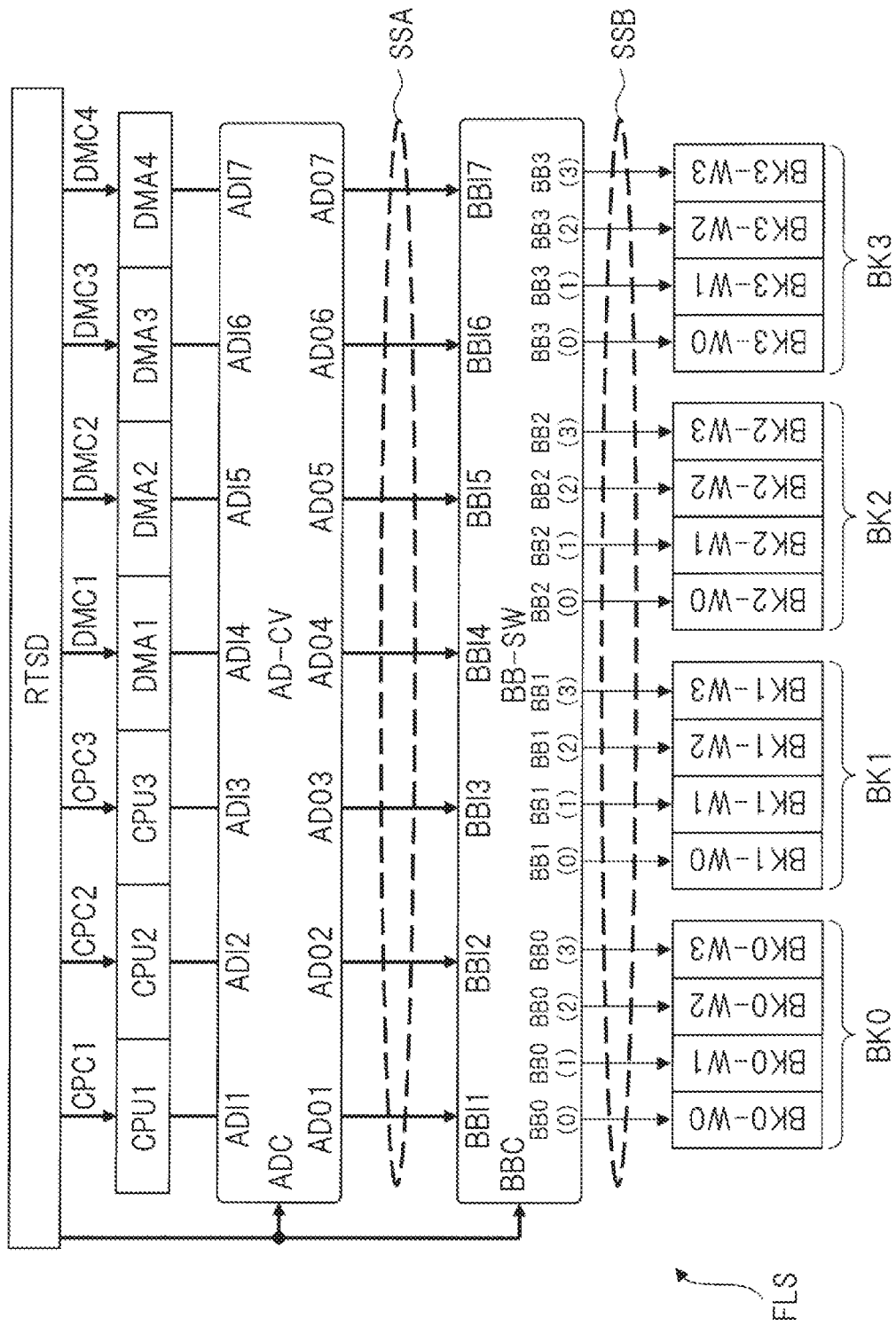
FIG. 7 is a diagram illustrating the control of a real-time schedule unit at the time of parallel startup involving the first embodiment.

Control by real-time schedule unit FIG. 7 is a diagram for explaining the parallel activations by control of the real-time schedule unit with respect to the first embodiment. FIG. 8 is a timing chart for explaining the parallel activation based on the operation of the first embodiment.

Since FIG. 7 is similar to FIG. 1, the differences will be mainly explained. In FIG. 7, the first transfer information acquisition circuit TISC1, the second transfer information acquisition circuit TISC2, and the memory access monitor circuit MACM shown in FIG. 1 are omitted. In FIG. 7, SSAs and SSBs indicated by broken lines indicate access routes between a plurality of masters (processor CPU1~CPU3 and DMA controllers DMA1~DMA4) and a plurality of slaves (memory ways BK0-W0~BK3-W3).

The address can be arbitrarily changed at the time of address conversion by the address converter AD-CV by the conversion information supplied from the real-time schedule unit RTSD to the control terminal ADC of the address converter AD-CV. The conversion address signal formed by the address converter AD-CV can be supplied to any memory way by the selection signal supplied from the real-time schedule unit RTSD to the control terminal BBC of the bus switch circuit BB-SW. Thus, for example, the plurality of arbitrary memory ways can be accessed in parallel based on the address signals outputted from the processors CPU1, the CPU2, and the DMA controllers DMA1 and DMA2, respectively.

That is, the real-time schedule unit RTSD can arbitrarily select an access route between the masters and the slaves. At this time, since the real-time schedule unit RTSD can assign tasks to arbitrary masters, the real-time scheduling RTSD can arbitrarily select masters of access routes. Here, although the access route between the master and the slaves is described as an example in which tasks are assigned to the processor CPU1 the CPU2 and the DMA controller DMA1, and the DMA2, the access route is not limited to this example. Of course, the number of masters may be arbitrary.

The real-time schedule unit RTSD assigns the first parent task and the second parent task to the processor CPU1, the CPU2 and DMA controllers DMA1 and DMA2 under the control indicated by the symbols CPC1, the CPC2, the DMC1 and the DMC2 in FIG. 7. The real-time schedule unit RTSD sets the access route so that the processors CPU1, the CPU2 and the DMA controllers DMA1 and DMA2 can access the bank memory BK0 including the memory way BK0-W0~BK0-W3 and the bank memory BK1 including the memory way BK1-W0~BK1-W3 by the conversion information supplied to the control terminal ADC of the address converter AD-CV and the selection signals supplied to the control terminal BBC of the bus switch circuit BB-SW.

Figure 8B:
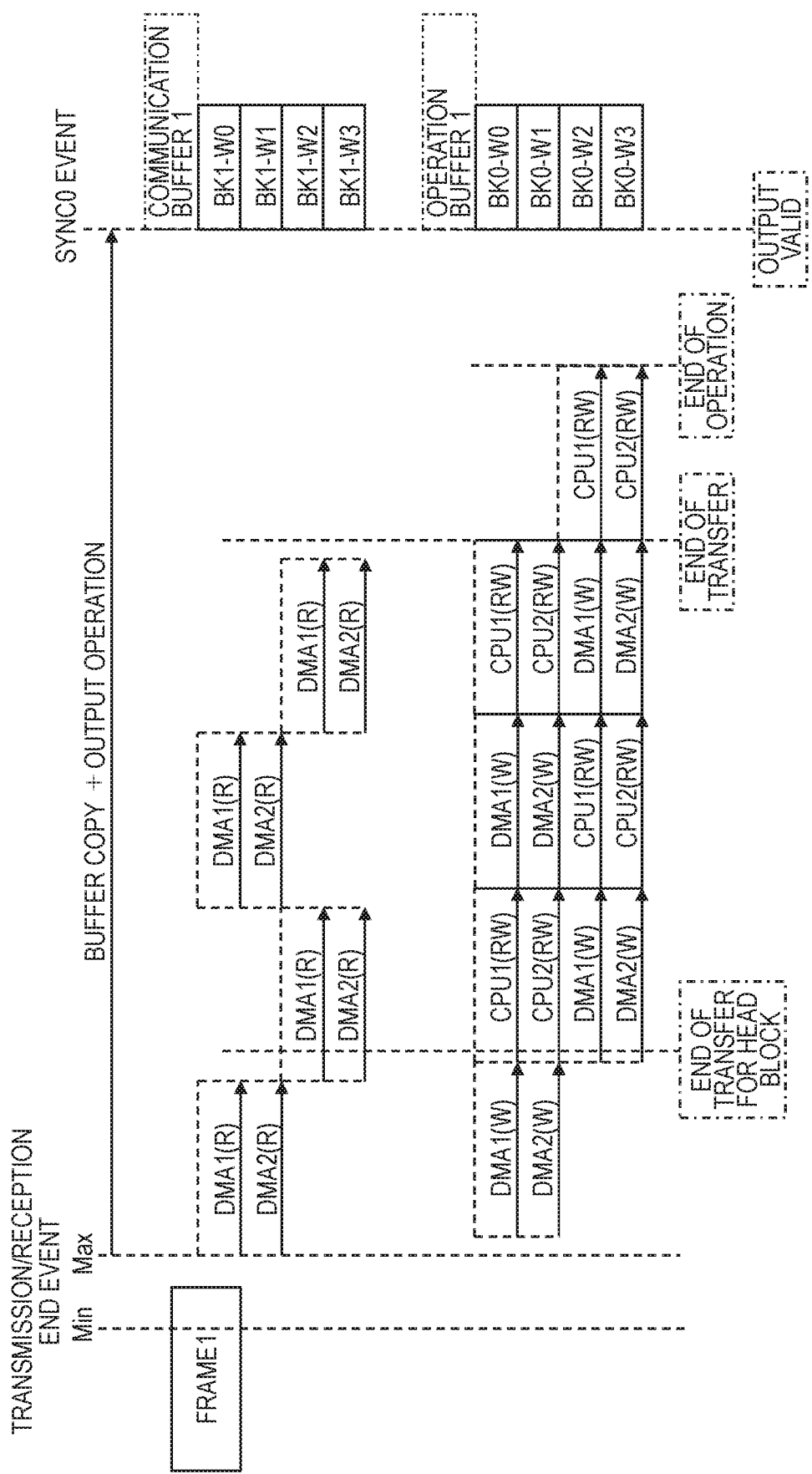

As a result, the first parent task and the second parent task can be executed by the processor CPU1, the CPU2, and the DMA controllers DMA1 and DMA2. Next, the operation at the time of parallel activation will be described with reference to FIGS. 8A and 8B. FIG. 8A is a timing chart showing an operation at the time of parallel activation. FIG. 8B is a timing chart showing operation timings of the masters (the processor CPU1, the CPU2, and the DMA controllers DMA1 and DMA2) at the time of parallel activation. FIG. 8A is the same as FIG. 3, and therefore description thereof is omitted, but the operation timing of the master in the portion relating to the processing of "buffer copy+output operation" shown in FIG. 8A is shown in FIG. 8B.

In FIG. 8B, a block DMA1(R) indicated by a broken line indicates a period in which the DMA controller DMA1 accesses the memory way and reads data from the memory way, and a block DMA1(W) indicated by a broken line indicates a period in which the DMA controller DMA1 accesses the memory way and writes data to the memory way. Similarly, a broken line block DMA2(R) indicates a period during which the DMA controller DMA2 is reading data from the memory way, and a broken line block DMA2 (W) indicates a period during which the DMA controller DMA2 is writing data to the memory way. Since the DMA controller can perform writing while reading, a part of the reading period and the writing period can overlap with each other in time.

In FIG. 8B, blocks CPU1(RW) indicated by broken lines indicate periods during which the processor CPU1 accesses the memory way, reads data, performs an operation on the read data, and writes the data of the operation result obtained by the operation to the memory way. Similarly, the broken-line blocks CPU2(RW) indicate periods during which the processor CPU2 accesses the memory way, reads data, performs an operation, and writes data of the operation result to the memory way.

In FIG. 8B, each of the BK0-W0~BK0-W3 and the BK1-W0~BK1-W3 is the above-described memory way. Here, the memory way BK0-W0~BK0-W3 in the bank memory BK0 is used as the operation buffer 1, and the memory way BK1-W0~BK1-W3 in the bank memory BK1 is used as the communication buffer 1. In each of the memory ways BK1-W0~BK1-W3 used as the communication buffers 1, blocks of data constituting the frame 1 are stored in synchronization with the occurrence of transmission/reception end event. Although not particularly limited, in FIG. 8B, it is assumed that the frame 1 has eight blocks, and two blocks are stored in each of the memory ways BK1-W0~BK1-W3 used as the communication buffers 1.

When the transmission/reception end event occurs, the application is started, and the first parent task for performing the processing of "buffer copy+output operation" is started. When the first parent task is activated, first, the DMA controllers DMA1 and DMA2 start operation. As a result, the DMA controllers DMA1 and DMA2 access the memory ways BK1-W0 and BK1-W2 via the access route, and read the data of the frame 1 stored in the memory ways BK1-W0 and BK1-W2 (DMA1(R) and DMA2(R) in FIG. 8B). Further, the DMA controllers DMA1 and DMA2 access the memory ways BK0-W0 and BK0-W1 via the access route, and write the data read in the periods DMA1(R) and DMA2(R) to the memory ways BK0-W0 and BK0-W1 later than the start time of reading the data of the frame 1 by the DMA controllers DMA1 and DMA2. As a result, the data related to the frame 1 stored in the memory ways BK1-W0 and BK1-W1 are transferred (copied) to the memory ways BK0-W0 and BK0-W1. In this instance, the data stored in the memory ways BK1-W0 and BK1-W1 are transferred to the memory ways BK0-W0 and BK0-W1 substantially simultaneously.

When data for one block related to the frame 1 stored in each of the memory ways BK1-W0 and BK1-W1 is transferred to the memory ways BK0-W0 and BK0-W1, the transfer of the frame head block is completed.

Though not particularly limited, the processors CPU1 and CPU2 start their operations when the frame head blocks have been transferred. In the periods CPU1 (RW) and CPU2 (RW), the processors CPU1 and CPU2 access the memory ways BK0-W0 and BK0-W1 via the access route, read the data related to the frame 1 stored in the memory ways BK0-W0 and BK0-W1, perform the outputting operation, and write (write back) the operation result data to the memory ways BK0-W0 and BK0-W1. In this instance, the data reading, the data outputting operation, and the data writing to the memory ways BK0-W0 and BK0-W1 are performed substantially simultaneously.

When the processors CPU1 and CPU2 are performing processes in the periods CPU1 (RW) and CPU2 (RW), the DMA controllers DMA1 and DMA2 access the memory ways BK1-W2 and BK1-W3 via the access route in the periods DMA1 (R) and DMA2 (R), read data related to the frame 1 The DMA controllers DMA1 and DMA2 access the memory ways BK0-W2 and BK0-W3 via the access route in the periods DMA1 (W) and DMA2 (W), and write data related to the read frame 1. As a result, the data related to the frame 1 is transferred from the memory ways BK1-W2 and BK1-W3 to the memory ways BK0-W2 and BK0-W3.

When the data for one block related to the frame 1 stored in each of the memory ways BK1-W2 and BK1-W3 is transferred to the memory ways BK0-W2 and BK0-W3, the processors CPU1 and CPU2 access the memory ways BK0-W2 and BK0-W3 via the access route in the periods CPU1 (RW) and CPU2 (RW), read the data related to the frame 1, perform the output operation, and write the output operation back to the memory ways BK0-W2 and BK0-W3.

As a result, the buffer copy and the output operation are completed for four of the eight blocks constituting the frame 1. The remaining four blocks are also performed in the same manner as described above. In this instance, the periods CPU1(RW) and CPU2(RW), in which the processors CPU1 and CPU2 are executing reading data stored in the memory ways BK0-W2 and BK0-W3 and perform the output operation and writing back operation, and the periods DMA1(R) and DMA2(R), in which the DMA controllers DMA1 and DMA2 transfer data stored in the memory ways BK1-W0 and BK1-W1 to the memory ways BK0-W0 and BK0-W1, overlap with each other.

The timing at which all of the eight blocks constituting the frame 1 are transferred from the memory way BK1-W0~BK1-W3 as the communication buffer 1 to the memory way BK0-W0~BK0-W3 as the operation buffer 1 is the timing at which the transfer is completed. Further, the timing at which the processor CPU1 and CPU2 perform the output operation on all of the eight blocks and the data of the operation result is written back to the operation buffer 1 is the timing at which the operation is finished.

As described above, by increasing the number of parallel activations, it is possible to shorten the execution time of the task. In FIG. 8B, it is possible to terminate the transfer (transfer termination) and terminate the operation (operation termination) before the timing at which the sync0 event occurs, that is, the timing at which the output is required to be valid.

Here, the operation has been described taking as an example the first parent task that performs the processing of "buffer copy+output operation" as an example, but the same applies to the second parent task that performs the processing of "input operation+buffer copy".

For example, the result of the second parent task performing the predetermined process is stored in the operation buffer 1, e.g., the memory way BK0-W0~BK0-W3. In the second parent task, the processors CPU1 and CPU2 access the memory ways BK0-W0 and BK0-W1 via an access route, read, perform an input operation and write back operation. Next, the DMA controller DMA1 and DMA2 access the memory ways BK0-W0 and BK0-W1 via the access route, read the data, and writes the data to the memory ways BK1-W0 and BK1-W1 as the communication buffer 1. While the DMA controller DMA1 and DMA2 are reading and writing data, the processors CPU1 and CPU2 access the memory ways BK0-W2 and BK0-W3, read, and perform output operation and write back operation. Thereafter, the two processors CPU1 and CPU2 and the two DMA controllers DMA1 operate in parallel.

Task Start Based on Determined Task Input Data

Next, an example in which, when task input data is determined, a task is started in accordance with the determined data will be described. As described with reference to FIG. 3, the data constituting the received frame is compressed. Therefore, in order to perform predetermined operation and predetermined processing on the received frame 1 shown in FIG. 3, it is necessary to decompress the compressed data.

Therefore, in the first parent task described above, after copying the data to the communication buffer 0, the data is read out from the communication buffer 0 and decompressed, and an operation is performed on the decompressed data. The data size of the decompressed data depends on the compressed data. Therefore, even if data amount of read data from the communication buffer 0 is same, data amount of decompressed data is different.

FIG. 9 is an explanatory diagram for explaining the operation of the semiconductor device FLS related to the first embodiment. Here, an example of the processing performed in the first parent task and the data size of the data obtained by the processing will be described. For ease of explanation, it is assumed that the received frame 1 has a data volume of 4 KB and is stored in the memory way BK0-W0~BK0-W3 of the bank memory BK1 constituting the communication buffers 0 as reception data blocks 1 to 4 in units of 1 KB. Each of the received data blocks 1 to 4 is compressed data, and as shown as received data in FIG. 9, each data size is 1 KB (1024 bytes).

In the first parent task, first, a buffer copy process (1) is performed in which each of the received data blocks 1 to 4 is copied from the communication buffer 0 to the operation buffer 1 configured by the bank memory BK1. Since the output data copied to the operation buffer 1 by the buffer copy process (1) is compressed data, the data size of the output data is 1 KB, which is the same as that of the received data block, as shown in FIG. 9.

Next, in the first parent task, the data decompression process (2) is performed for each of the received data blocks 1 to 4, and then the operation process (3) is performed for each of the received data blocks 1 to 4.

Here, when the received data blocks 1 to 4 are decompressed, the data size of the decompressed received data block 1 is assumed to be 2.5 times the data size of the original received data block 1, and the data size of the decompressed received data block 2 is assumed to be 1.5 times the data size of the original received data block 2. It is also assumed that the data size of the decompressed received data block 3 becomes the same as the data size of the original received data block 3, and the data size of the decompressed received data block 4 becomes twice the data size of the original received data block 4.

Therefore, as shown in FIG. 9, the size of the output data obtained by the data decompression process (2) is 2.5 KB (2560 bytes) in the received data block 1, and is 1.5 KB (1536 bytes) in the received data block 2. Further, by the data decompression process (2), the data size of the received data block 3 becomes 1 KB (1024 bytes), and the data size of the received data block 4 becomes 2 KB (2048 bytes).

The size of the output data obtained by the operation process (3) varies according to the type of operation process, but here, as shown in FIG. 9, it is assumed that it is the same as the size of the output data obtained by the data decompression process (2).

The real-time schedule unit RTSD according to the embodiment determines whether or not the input data of the task has been determined based on the translation address signal notified from the memory access monitor circuit MACM and the information stored in the data determination register MACM_R. When the real-time schedule unit RTSD determines that the input data has been determined, the real-time schedule unit RTSD preferentially starts the task corresponding to the input data. The real-time schedule unit RTSD determines whether read or write accesses have been made to predetermined consecutive address areas in the bank memory BK0~BK3 based on the notified translated address signals. When accesses are made to predetermined consecutive areas of addresses, the real-time schedule unit RTSD determines that the input data of the task has been determined.

Figure 10:
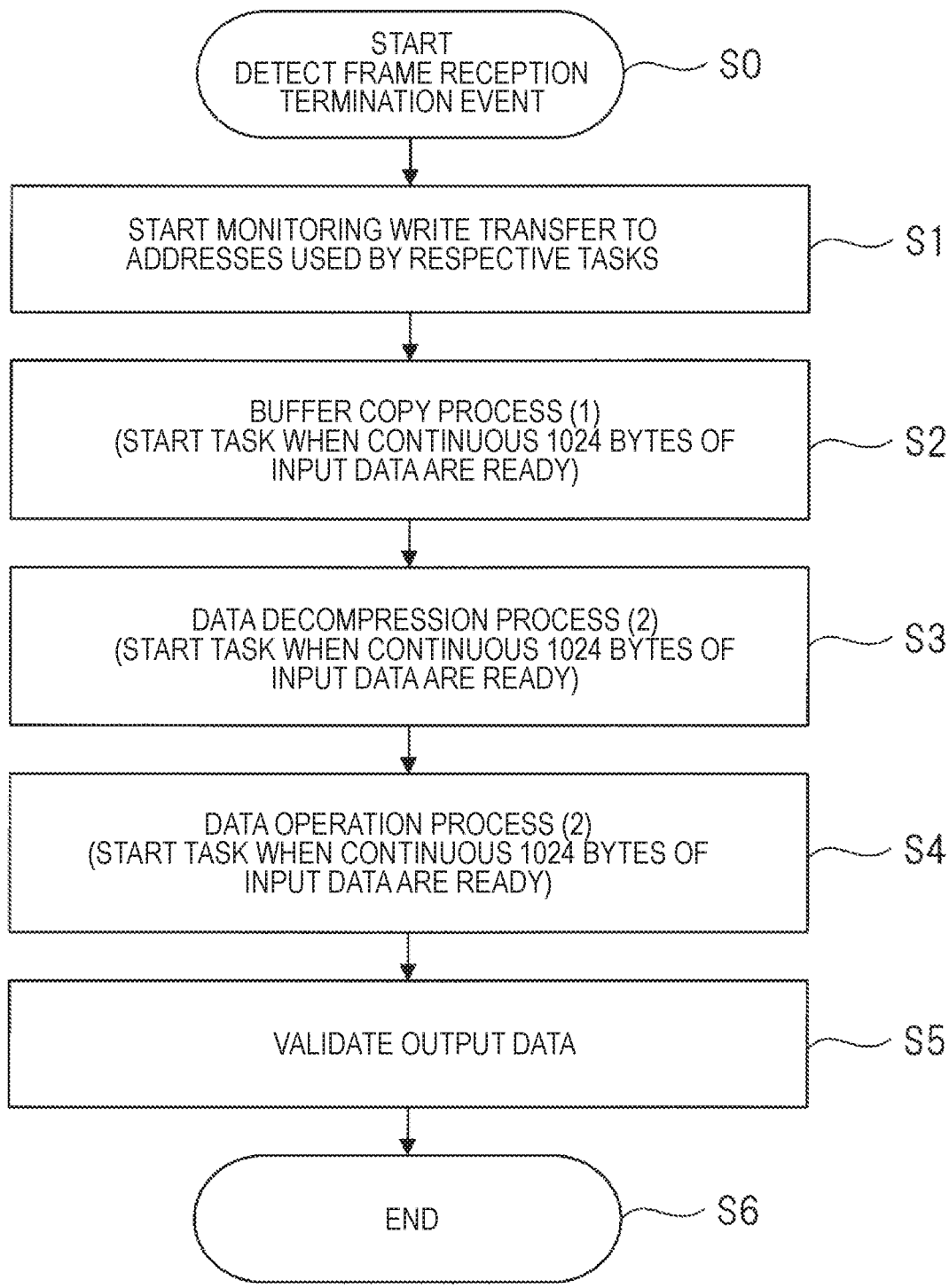
FIG. 10 is a flow chart showing the operation of a real-time schedule unit related to the first embodiment.

FIG. 10 is a flow chart showing the operation of the real-time schedule unit RTSD related to first embodiment. Here, the task is started when the input data of the task is determined by taking 1 KB (1024 bytes) as an example of the predetermined consecutive address area described above. Of course, the present invention is not limited to the 1 KB size described herein. The size of a predetermined consecutive address area may be data of a size necessary for a master assigned to a task to execute the task.

The task described here is a child task. Each of the first parent task, the second parent task, and the third parent task is composed of a plurality of child tasks. For example, the first parent task is executed by executing a plurality of child tasks constituting the first parent task. The same applies to the second parent task and the third parent task.

In operation S0, the real-time schedule unit RTSD receives a frame and detects a frame reception termination event. Upon detecting frame reception termination events, the real-time schedule unit RTSD performs the following steps.

First, in step S1, the real-time schedule unit RTSD starts monitoring the write (write transfer) to the address area used by the respective child tasks. That is, the memory access monitor MACM shown in FIG. 1 starts acquiring the converted address signals. The real-time schedule unit RTSD starts the control of the activation of the child tasks by using the translation address signal notified from the memory access monitor circuit MACM and the data determination register MACM_R.

In step S2, the real-time schedule unit RTSD assigns a buffer copy task to the master and causes the master to execute the buffer copy task so that the buffer copy process (1) is performed. The real-time schedule unit RTSD determines whether or not received data blocks (input data) have been stored in all of the consecutive 1 KB address areas in the bank memory as communication buffer. When received data has been stored in all of the 1 KB address areas, the real-time schedule RTSD unit determines that the input data has been prepared, and starts the buffer copying task (1) of copying the received data blocks from the communication buffer to the operation buffer. The real-time schedule unit RTSD can then be considered as determining whether or not the input data is prepared based on the writing of a 1 KB block of received data to the communication buffers.

Next, the real-time schedule unit RTSD executes step S3. In operation S3, the real-time schedule unit RTSD performs data decompression process (2) and assigns tasks for data decompression to the master so that the data decompression process (2) is performed. The real-time schedule unit RTSD (2) judges whether or not a received data block, which is input data for the data decompression task, is prepared by using the memory access monitor circuit MACM and the data determination register MACM_R shown in FIG. 1. Specifically, the real-time schedule unit RTSD determines whether or not the input data for the data decompression task (2) has been prepared depending on whether or not the received data has been written (copied) to all of the address areas of the consecutive 1 KB of the operation buffer according to the (1) buffer copy task that was started in step S2. When it is determined that the received data has been written in all of the 1 KB address areas, the real-time schedule unit RTSD starts the data decompression task (2) as the master task. (2) By executing the data decompression task, the received data is decompressed and written to the operation buffer.

In S4, the real-time schedule unit RTSD assigns (3) data operation task corresponding to the data operation process (3) to the master so as to perform the data operation process (3) on the received data block. In step S3, (2) when the data decompression task is executed, the decompressed received data is written in the operation buffer. In step S4, as in step S3, the real-time schedule unit RTSD determines (3) whether or not the received data block, which is the input data for the data operation task, is prepared by using the memory access monitor circuit MACM and the data determination register MACM_R.

Specifically, the real-time schedule unit RTSD determines whether or not (3) the input data for the data operation task has been prepared based on whether or not the received data decompressed in all of the consecutive 1 KB address areas of the operation buffers has been written by the data decompression task (2) started in step S3. When it is determined that the decompressed received data has been written in all of the 1 KB address areas, the real-time schedule unit RTSD starts (3) the data operation task in the master. (3) By executing the data operation task, a predetermined operation is performed on the decompressed received data block, and the data operation result is written in the operation buffer.

Next, in S5, the real-time schedule unit RTSD completes the data operation for the received frame and validates the output data for the received frame (referred to as "output valid" in FIG. 3). Thereafter, in step S6, the real-time schedule unit RTSD terminates the process started in step S0.

Next, the details of the data determination register MACM_R and the detailed operation of the real-time schedule unit RTSD using the memory access monitor circuit MACM and the data determination register MACM_R will be described.

FIG. 11A to 11C are diagrams showing a configuration of a data determination register MACM_R related to first embodiment. The data determination register MACM_R includes three kinds of registers. That is, the data determination register MACM_R includes a task start condition setting register TSCR shown in FIG. 11A, a task start control pointer TSSP shown in FIG. 11B, and a task pause condition setting register TTSR shown in FIG. 11C. The task pause condition setting register TTSR of FIG. 11C will be described later with second embodiment, and therefore, the explanation thereof will be omitted.

The task start condition setting register TSCR includes a plurality of task start condition setting registers corresponding to child tasks. Similarly, the task start control pointer TSSP includes a plurality of task start control pointers corresponding to child tasks. When looking at the child task as a reference, the task start condition setting register and the task start control pointer correspond to each other. FIG. 11A illustrates two task start condition setting registers TSCR_1 and TSCR_3 among a plurality of task start condition setting registers, and FIG. 11B illustrates task start control pointers TSSP_1 and TSSP_3 corresponding to these task start condition setting registers. The task start control pointers TSSP_2 and TSSP_4 shown in FIG. 11B correspond to the task pause condition setting registers TTSR_1 and TTSR_2 in the second embodiment described later.

In first embodiment, prior to executing an application, a task start condition setting register and a task start control pointer are assigned to each child task, and conditions are set as data in the assigned task start condition setting register and task start control pointer. That is, identification information for specifying a child task to be assigned, for example, a task ID, is set for the start target task portion (region) in the task start condition setting register and the associated task portion (region) to which the task start control pointer are related. In addition, conditions for determining that the input data has been determined in the assigned child task are set for the condition portion (area) of the task start condition setting register and the condition portion (area) of the task start control pointer.

A concrete description will be given with reference to FIGS. 11A to 11C as an example. Here, the data decompression process (2) and the operation process (3) described in FIG. 10 will be described as an example, but the same applies to the buffer copy process (1) described in FIG. 10.

The start target task portion in the task start condition setting register TSCR_1 and the associated task portion in the task start control pointer TSSP_1 corresponding to the task start condition setting register TSCR_1 are set with a data decompression task (identifier DDT) (2) for decompressing data. In addition, (3) an data operation task (identifier DAT) for operating data is set in the start target task portion in the task start condition setting register TSCR_3 and the associated task portion in the task start control pointer TSSP_3 corresponding to the task start condition setting register TSCR_3. Operation by the task start condition setting registers TSCR_1 and TSCR_3 and the task start control pointers TSSP_1 and TSSP_3

In the condition portion of the task start control pointer TSSP_1, the head address of the address area to be read from the bank memory BK0~BK3 when the master, which is called first master, executes (2) the data decompression task, is set as the address information SAD_1. On the other hand, in the condition portion of the task start condition setting register TSCR_1 corresponding to the task start control pointer TSSP_1, when (1) the buffer copy task is executed by the master, which is called second master, the address region corresponding to the data of the size necessary for the first master to execute (2) the data decompression task is set as the address range information ADD_1 of the continuous address region having the address information SAD_1 as the head address.

The real-time schedule unit RTSD performs the following processing when the second master performs the buffer copying task (1) and writes the received data block to the bank memory. The real-time schedule unit RTSD determines whether all of the predetermined consecutive address areas indicated by the address range information ADD_1 of the task start condition setting register TSCR_1 having the address information SAD_1 of the task start control pointer TSSP_1 as the head address have been written, using the memory access monitor circuit MACM. (1) When it is determined that data has been written in all of the predetermined consecutive address areas depending on the execution of (1) buffer copy task, the real-time schedule unit RTSD starts (2) the data decompression task (DDT) set in the start target task portion of the task start condition setting register TSCR_1 in the first master.

When the size of the data required to execute (2) the data decompression task is 1 KB (1024 bytes) as described above, (1) the buffer copy task is executed, and when the writing of the received data from the second master is executed for all of the address areas 1 KB consecutive from the head address indicated by the address information SAD_1, (2) the input data of the data decompression task is determined, and (2) the data decompression task is started.

In the condition part of the task start control pointer TSSP_3, (3) the start address of the address area in the bank memory read by the master (for convenience, referred to as the third master) executing the data operation task when executing the data operation task is set as the address information SAD_3. On the other hand, in the condition portion of the task start condition setting register TSCR_3, when the first master executes (2) the data decompression task, the address region corresponding to the data of the size necessary for the third master to execute (3) the data operation task is set as the address range information ADD_3 of the continuous address region having the address information SAD_3 as the head address. Although not particularly limited, it is assumed that the address range information ADD_3 is also 1 KB.

The real-time schedule unit RTSD determines the addresses for writing to the bank memory by the first master by using the memory access monitor MACM when the first master performs (2) data-decompression tasks. That is, the first master determines whether or not writing has been performed on the 1 KB consecutive address area indicated by the address range information ADD_3 from the head address indicated by the address information SAD_3. When writing is performed for all of the address ranges of 1 KB from the head address indicated by the address data SAD_3, the real-time schedule unit RTSD starts (3) the data operation task in the third master.

As described above, the real-time schedule unit RTSD can start (2) the data decompression task as described with reference to FIG. 10 when (2) the input data of the data decompression task is determined (written) by using the task start condition setting register TSCR_1 and the task start control pointer TSSP_1. The real-time schedule unit RTSD uses the task start condition setting register TSCR_3 and the task start control pointer TSSP_3 to when the input data of (3) the data operation task is determined (written) as described with reference to FIG. 10, and (3) the data operation task can be started.

Example of Operation by Semiconductor Device

Next, an operation example of starting a task when task input data is determined in the semiconductor device FLS shown in FIG. 1 will be described.

FIG. 12 is a diagram for explaining the operation of the semiconductor device according to the embodiment. Here, a case will be described in which each of the buffer copy process (1), the data decompression process (2), and the data operation process (3) is executed by a plurality of child tasks ((1) a buffer copy task, (2) a data decompression task, and (3) an arithmetic task) by an assigned master. The real-time schedule unit RTSD assigns the DMA controller DMA1~DMA4 as a master for (1) the buffer copy task, assigns the DMA controller DMA1~DMA4 as a master for (2) the data decompression task, and assigns the processor CPU1~CPU3 as a master for (3) the data operation task.

Figure 12A:
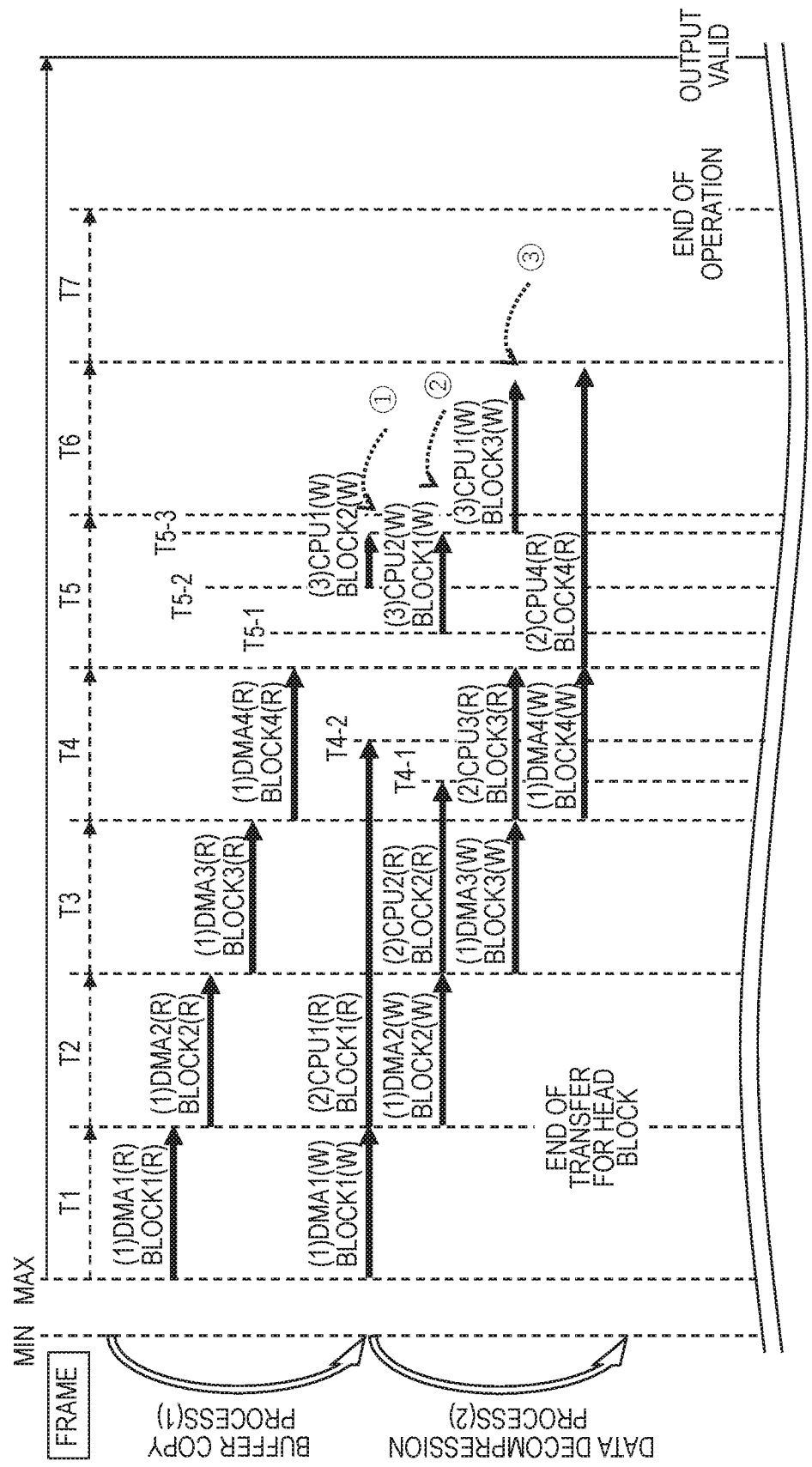

FIGS. 12A and 12B shows the execution state of each task with time. In FIGS. 12A and 12B, the horizontal axis represents time, and the vertical axis represents process. FIG. 12C shows a bank memory BK0~BK3 including memory ways W0 to W3, respectively. Here, the bank memory BK0 is used as the communication buffer 0, and the bank memory BK1~BK3 is used as the operation buffers 1 to 3. The processes are executed in the order of a buffer copy process (1), a data decompression process (2), and an data operation process (3), as indicated by a white arrow on the leftmost side of FIG. 12A.

In FIGS. 12A and 12B solid lines with arrows indicate child tasks. For example, in the code "(1) DMA1(R) Block 1 (R)" of the child task shown in FIG. 12A, the number "(1)" enclosed by the head ( ) indicates (1) the buffer copy task, and the code "DMA1" indicates that the master assigned to the task is the DMA controller DMA1. Also, the symbol "R" in the parenthesis after the symbol "DMA1" indicates that the DMA controller DMA1 performs read operation, the symbol "block 1" indicates that the object of this task is the received data block 1, and the symbol "R" in the parenthesis after the symbol "block 1" indicates that the operation for the object of the task is a read. Other tasks are described in the same manner. In addition, a symbol W in parentheses after a symbol specifying a DMA controller and a processor indicates that the DMA controller and the processor perform a write operation, and a symbol W in parentheses indicating an operation for a object of the task indicates that an operation for a block is a write.

In FIGS. 12A and 12B, a memory way in which a read or write operation is shown aligned with the child task based on executed the child task. For example, the child task "(1) DMA1 (R) block 1 (R)" shown in FIG. 12A indicates that the received block 1 is read from the memory way BK-W0 of the communication buffer 0 in FIG. 12C according to executing the child task. The relationship between the other child tasks and the memory way is the same.

As described with reference to FIG. 9, this figure shows a case in which the received data block 1 becomes 2.5 times, the received data block 2 becomes 1.5 times, the received data block 3 becomes 1 times, and the received data block 4 becomes 2 times with respect to the received data of 1 KB by the data decompression process. The received data block 3 and the received data block 1 will be described as representatives.

Received Data Block 3

Received data block 3 is read from the memory way BK0-W2 of communication buffer 0 when the child task "(1) DMA3(R) block3(R)" is executed at period T3. The read received data block 3 is written in the consecutive address area of 1 KB in the memory way BK1-W3 of the operation buffer 1 by executing the child task "(1) DMA3(W) block3 (W)" in the period T3.

The real-time schedule unit RTSD uses the memory access monitor circuit MACM to detect the writing of the received data block 3 to the consecutive 1 KB of the address area in the memory way BK1-W2 by the child task "(1) DMA3(W) block3(W)".

When the real-time schedule unit RTSD detects a write to the address area of 1 KB consecutively, the real-time scheduling RTSD determines that the condition of the task start condition setting register TSCR_1 is satisfied, and causes the child task "(2) CPU3(R) block3(R)" to be executed in the time T4. As a result, the received data block 3 is read from the memory way BK1-W2, and the data decompression process is performed on the read received data block 3. Since the data size of the received data block 3 after data decompression process is 1 time, the decompressed received data block 3, which is the received data block after data decompression process, is 1 KB.

The real-time schedule unit RTSD causes the child task "(2) CPU3(W) block3(W)" to be executed in the time T4. As a result, the decompressed received data block 3 is written in the address area of 1 KB consecutive to the address area of the memory way BK3-W1 of the operation buffer 3 in the time T4.

The real-time schedule unit RTSD uses the memory access monitor circuit MACM to detect the write of the decompressed received data block 3 to the consecutive 1 KB of the address area in the memory way BK3-W1 by the child task "(2) CPU3(W) block3(W)".

When the real-time schedule unit RTSD detects the write of the decompressed received data block 3 to the consecutive 1 KB address area, the real-time schedule unit RTSD starts the task "(3) CPU1 block3(R)" at the time T5-3 on the assumption that the condition of the task start condition setting register TSCR_3 is satisfied. The task "(3) CPU1(R) block3(R)" reads the decompressed received data block 3 from the memory way BK3-W1, and a predetermined calculation is performed on the read decompressed received data block 3. The post-operation reception data block 3 obtained from the predetermined operation is written to the memory way BK1-W2 of the operation buffer 1 by the real-time schedule unit RTSD starting the task "(3) CPU1 (W) block3(W)" at the time T5-3.

As described above, the reception data block 3 stored in the memory way BK0-W2 of the communication buffer 0 is subjected to the buffer copy process (1), the data decompression process (2), and the data operation process (3), and the post-operation reception data block 3 is stored in the memory way BK1-W2 of the operation buffer 1.

Received Data Block 1

In period T1, the receiver data block 1 of 1 KB is read from the memory way BK0-W0 of communication buffer 0 by the child task "(1) DMA1(R) block1(R)". In parallel with this read operation, the read received data block 1 is written to the consecutive 1 KB address areas in the memory way BK1-W0 of the operation buffer 1 by the child tasks "(1) DMA1(W) block1(W)" in the same time period T1.

The real-time schedule unit RTSD uses the memory access monitor circuit MACM to detect the writing of the received data block 1 to the consecutive 1 KB address area in the memory way BK1-W0 by the child task "(1) DMA1 (W) block1(W)".

When the real-time schedule unit RTSD detects a write to the address area of 1 KB consecutively, the real-time schedule unit RTSD determines that the condition of the task start condition setting register TSCR_1 is satisfied, and causes the child task "(2) CPU1(R) block1(R)" to be executed in the time T2. As a result, the received data block 3 is read from the memory way BK1-W0, and data decompression is performed. Since the decompressed received data block 1 is 2.5 KB, the read operation of the decompressed received data block 1 is performed until time T4-2.

The real-time schedule unit RTSD writes the first consecutive 1 KB of the decompressed received data block 1 (hereinafter, referred to as the first decompressed received data block 1) of the decompressed received data block 1, to the consecutive 1 KB of the address area of the memory way BK2-W0 of the operation buffer 2 by the child task "(2) CPU1(W) block1(W)" in the period T2. The real-time schedule unit RTSD writes the next consecutive 1 KB of the decompressed received data block 1 (hereinafter, referred to as the second decompressed received data block 2) in the decompressed received data block 1 to the consecutive 1 KB of the memory way BK2-W1 of the operation buffer 2 by the child task "(2) CPU1(W) block1(W)" in the period T3. Further, the real-time schedule unit RTSD writes the remaining consecutive 0.5 KB decompressed received data blocks 1 of the decompressed received data block 1 to the consecutive 0.5 KB address area of the memory way BK2-W3 of the operation buffer 2 by the child task "(2) CPU1(W) block1 (W)" during the period from the start of the period T4 to the time T4-2.

The real-time schedule unit RTSD uses the memory access monitor circuit MACM to detect writing of the first decompressed received data block 1 to the consecutive 1 KB address area in the memory way BK2-W0 by the child task "(2) CPU1(W) block1(W)".

When the real-time schedule unit RTSD detects writing to the address area of consecutive 1 KB in the memory way BK2-W0, the real-time schedule unit RTSD starts the child task "(3) CPU3(R) Block1(R)" in the time T3, assuming that the condition of the task start condition setting register TSCR_3 is satisfied. The first decompressed received data block 1 is read from the memory way BK2-W0 by the child task, and a predetermined operation is performed by the child task. The first operated received data obtained by the predetermined operation is written to the memory way BK3-W1 of the operation buffer 3 by the child task "(3) CPU3(W) block1(W)" in the period T3.

The real-time schedule unit RTSD uses the memory access monitor circuit MACM to detect the writing of the second decompressed received data block 1 to the consecutive 1 KB address area in the memory way BK2-W1 by the child task "(2) CPU1(W) block1(W)". When the real-time schedule unit RTSD detects a write to the address area of consecutive 1 KB in the memory way BK2-W1, the real-time schedule unit RTSD starts the child task "(3) CPU2(R) block1(R)" in the period from time T4-1 to time T5-1, assuming that the condition of the task start condition setting register TSCR_3 is satisfied. By this child task, the second decompressed received data block 1 is read from the memory way BK2-W1, and a predetermined operation is performed. The second operated received data obtained by the predetermined operation is written in the memory way BK3-W2 of the operation buffer 3 by the child task "(3) CPU2(W) block1(W)" in the period from the time T4-1 to the time T5-1.

The real-time schedule unit RTSD starts the child task "(3) CPU2(R) Block1(R)" at the time T5-1 when the real-time schedule unit RTSD detects the completion of the writing of the third decompressed received data block 1 to the contiguous address area of the memory way BK2-W3 at the time T4-2. The child task "(3) CPU2(R) block1(R)" reads the third decompressed received data block 1 written in the memory way BK2-W3 in the time period from the time T5-1 to the time T5-3, and performs a predetermined operation on the read decompressed received data block 1.

The real-time schedule unit RTSD starts the child task "(3) CPU2(W) Block1(W)" in the time period from the time T5-1 to the time T5-3. As a result, the third operated received data block 1 is written in the memory way BK1-W1 of the operation buffer 1 by the task "(3) CPU2(W) block1(W)" in the period from the time T5-1 to the time T5-3.

Since the third decompressed received data block 1 is 0.5 KB, when the decompressed received data block 1 is written to the memory way BK2-W3, all converted address signals specifying consecutive address regions of 1 KB are not outputted from the bus switch circuits BB-SW. However, the end information indicating the end of the received data block 1 is included in the frame 1 in advance, and is included in the third decompressed received data block 1. When the real-time schedule unit RTSD detects the end information, the real-time schedule unit RTSD determines that the writing of the third decompressed received data block 1 is completed, and starts the task "(3) CPU2(R) block1(R)" as described above. That is, another task assigned to the processor CPU2 starts the task "(3) CPU2(R) Block1(R)" with respect to the processor CPU2 at the time when the task ends at the time T5-1.

As described above, the buffer copy process (1), the data decompression process (2), and the operation process (3) are performed on the received data block 1 stored in the memory way BK0-W0 of the communication buffer 0, and the operation results are stored in the memory ways BK1-W0, the BK1-W1, and the BK3~W2.

The real-time schedule unit RTSD starts tasks for the received data blocks 2 and 4 in the same manner as the received data blocks 1 and 3.

As described above, the real-time schedule unit RTSD detects whether or not writing has been performed on consecutive 1 KB address areas of the bank memory. When the real-time schedule unit RTSD detects that writing has been performed on consecutive 1 KB addresses, the real-time schedule unit RTSD determines that the input data for the task to be started next has been determined, and starts the next task in accordance with the task scheduling. The real-time schedule unit RTSD, when detecting the end information even if the end information is not written to the consecutive 1 KB address area of the memory, judges that the input data of the child task to be started next has been determined, and starts the next task in accordance with the task scheduling. Therefore, the real-time schedule unit RTSD can preferentially start tasks whose input data has been determined, thereby improving the performance of the real-time schedule unit RTSD.

As described above, the real-time schedule unit RTSD divides the decompressed received data block 3, which exceeds the consecutive address area of 1 KB, into a plurality of consecutive address areas of 1 KB. That is, it can be considered that the decompressed received data block 3 is divided so as not to exceed an address area of 1 KB which is a condition for judging whether or not the input data of the task is determined.

In FIG. 12A, when the size of the decompressed received data block decompressed by the data decompression task is not an integral multiple of the size of the predetermined address area (0.5 KB in FIG. 12A), the end information is written to the memory way. This makes it possible to reduce the number of accesses to the memory way.

In the modified example, the master (processor in FIG. 12A) assigned to the data decompression task adds the adjusting data to the decompressed received data block such that the size of the decompressed received data block is an integral multiple of the size of the predetermined address area (1 KB in FIG. 12A). The adjustment data is, for example, a binary logic value "0". When writing the decompressed received data block to the memory way, after writing the decompressed received data block to the memory way so as to be an integer multiple of 1 KB, the master writes a plurality of binary logic values "0" to a portion which is insufficient to be an integer multiple.

Describing the received data block 3 as an example, in the period T4, the processor CPU1, which is the master, writes the binary logical value "0" for 0.5 KB to the address region after writing the data of 0.5 KB, which is the third decompressed reception data block 3. As a result, in the period T4, the task "(2) CPU1(W) block1(W)" associated with the decompressed received data block 3 writes the address area of 1 KB including consecutive addresses of the memory way BK2-W3. As a result, the real-time schedule unit RTSD can determine whether or not the input data for the next task has been determined without detecting the end information.

Second Embodiment

In the semiconductor device FLS related to (second embodiment) second embodiment, the data-determination register MACM_R shown in FIG. 1 includes the temporary stop condition setting register TTSR shown in FIG. 11C. The temporary stop condition setting register TTSR includes a number of temporary stop condition setting registers TTSR_1 to TTSR_n (not shown) corresponding to the number of tasks to be temporary stopped. Here, two tasks for data decompression task and data operation task will be described as examples of the task to be stopped temporarily. In FIG. 11C, the temporary stop condition setting register TTSR_1 corresponds to a data decompression task, and the temporary stop condition setting register TTSR_2 corresponds to a data operation task.

The temporary stop condition setting registers TTSR_1 and TTSR_2 include a condition part and a temporary stop target task part. An identifier for specifying a task to be stopped temporarily is set in the temporary stop target task part, and a condition for stopping temporarily is set in the condition part. Although not particularly limited, prior to operating the semiconductor device FLS, identifiers and conditions are set in the temporary stop target task part and the condition part of the temporary stop condition setting registers TTSR_1 and TTSR_2. In FIG. 11C, the identifier DTT for the data decompression task is set in the temporary stop target task part of the temporary stop condition setting register TTSR_1, and the condition ADS_1 is set in the condition part. The identifier DAT for the data operation task is set in the temporary stop target task part of the temporary stop condition setting register TTSR_2, and the condition ADS_2 is set in the condition part.

In FIG. 11C, a condition for temporarily stopping a task using the temporary stop condition setting registers TTSR_1 and TTSR_2 is described as a temporary stop condition. Of course, this temporary stop condition is for explanatory purposes, and is not included in the temporary stop condition setting registers TTSR_1 and TTSR_2.

The real-time schedule unit RTSD shown in FIG. 1 controls the task to be stopped temporarily by using the memory access monitor circuit MACM, the temporary stop condition setting registers TTSR_1 and TTSR_2, and the task start control pointers TSSP_2 and TSSP_4 shown in FIG. 11B.

The conditions ADS_1 and ADS_2 are address information for specifying a predetermined address area from the head address specified by the conditions SAD_2 and SAD_4 set in the corresponding task start control pointers TSSP_2 and TSSP_4. Here, it is assumed that address area information of 4 KB (4096 bytes) is set as the conditions ADS_1 and ADS_2. The real-time schedule unit RTSD sets the 4 KBs set as the conditions ADS_1 and ADS_2 as thresholds, and when the thresholds are exceeded, the real-time schedule unit RTSD temporarily stops the tasks DTT and DAT to be stopped. Next, the operation for suspending the data decompression task and the computation task will be described.

As described with reference to FIG. 12B, (2) the data decompression task (for example, "(2) CPU1(W) block1(W)") writes the decompressed received data block 3 to the bank memory. The decompressed received data block 3 written to the bank memory is then read by (3) data operation tasks "(3) CPU2(R) block1(R)".

The real-time schedule unit RTSD detects whether or not the address area, which is not read by the master assigned to the task other than (2) the data decompression task, with respect to the address area written by (2) the data decompression task exceeds the threshold value (4 KB) of the condition ADS_1 from the head address specified by the condition SAD_2. In other words, the real-time schedule unit RTSD detects whether or not read access has been performed by a master assigned to another task with respect to the address area written by the (2) data decompression task based on the converted address signals from the memory access monitor circuit MACM. If the detected address area in which is not accessed for read exceeds the address areas (thresholds) specified by the conditions SAD_2 and ADS_1, the real time schedule unit RTSD temporarily stops (2) the data-decompression task.

When (2) the data decompression task "(2) CPU1(W) block1(W)" is executed to write the decompressed received data block in the consecutive 1 KB address area in the memory way, it is determined that the input data for the data operation task "(3) CPU2(R) block1(R)" is fixed. In other words, the decompressed received data block written by (2) the data decompression task is normally read by a master assigned to the (3) data operation task other than the (2) data decompression task. However, for some reason, if the data is not read by the (3) data operation task even after the input data is determined, the decompressed received data block may overflow from the bank memory. According to the second embodiment, when an address area specified by the start address set in the condition SAD_2 and the threshold set in the condition ADS_1 is exceeded, by temporarily stopping the (2) data decompression task, the received data block after decompression can be prevented from overflowing the memory way.

As described in FIGS. 12A and 12B, according to the task for (3) the data operation (e.g. "(3) CPU1(W) block1(W))" the operated received data block 1 obtained by the predetermined operation is written to the memory way. The operated received data written to the memory way is read by a master assigned to another task other than the data operation task (3), and becomes input data for another task.

The real-time schedule unit RTSD detects whether or not the address area not read by the master assigned to another task other than the data operation task (3) exceeds the threshold (4 KB) of the condition ADS_2 from the start address set in the condition SAD_4 with respect to the address area written by the data operation task (3). That is, the real-time schedule unit RTSD detects whether or not the read access is performed by the master assigned to another task with respect to the address area written by the data operation task (3) based on the translated address signals from the memory access monitor circuit MACM. When the address area not accessed for reading exceeds the address area (thresholds) specified by the conditions SAD_4 and ADS_2, the real-time schedule unit RTSD temporarily stops the data operation task (3).

As in the case of the data decompression task (2), for some reason, even after writing the operated received data block to the memory way, if it is not read by another task, the operated received data block continues to be stored in the memory way, and it is feared that the operated received data block is accumulated too much beyond a predetermined area. According to the second embodiment, when the threshold value exceeds the threshold value set in the condition SAD_4 and the threshold value set in the condition ADS_2, (3) by temporarily stopping the data operation task, the operated received data block can be prevented from being stored excessively in the bank memory beyond the predetermined area.

The real-time schedule unit RTSD, for example, periodically detects whether or not the decompressed received data block or the operated received data block exceeds the threshold value specified by the conditions SAD_2, SAD_4, ADS_1, and ADS_2 set in the condition section by using the task start control pointers TSSP_2 and TSSP_4, the temporary stop condition setting register TTSR, and the memory access monitor circuit MACM. As a result, it is periodically detected whether or not the decompressed received data block overflows the memory way, and it is possible to detect whether or not the operation received data block is stored too far in the bank memory beyond a predetermined area. Also, if an overflow has occurred and/or is stored too much, it is possible to suspend the task of writing the target data temporarily and to eliminate the overflow or/and reduce the storage too much.

In the embodiment, the description has been made by taking a continuous address region of 1 KB as an example, but the present invention is not limited to this. That is, 1 KB is an example, and the address area may be an arbitrary address range. Further, the address area may be a discontinuous address area which is not continuous. For example, when the decompressed received data block is written in two discontinuous address areas, the register described in FIGS. 11A and 11B may be provided for each address area. Furthermore, although the received data has been described as an example, the present invention is not limited thereto. In addition, as a specific example, the description has been given taking the bank memory of 64 KB and the memory way of 1 KB as an example, but the present invention is not limited thereto.

The real-time schedule unit RTSD according to the embodiment can be regarded as monitoring whether or not the input data required by the task is determined by using the memory access monitor circuit MACM and the data determination register MACM_R.

Although the invention made by the present inventor has been specifically described based on the embodiment, the present invention is not limited to the embodiment described above, and it is needless to say that various modifications can be made without departing from the gist thereof.

What is claimed is:

1. A semiconductor device comprising:
   a plurality of masters;
   a real-time schedule unit coupled to the plurality of masters and controlling the plurality of masters to perform a plurality of tasks;
   a slave; and
   an access monitor circuit that detects address signals and access of the plurality of masters to the slave,
   wherein the slave comprises a memory,
   wherein the real-time schedule unit determines whether the address signals detected by the access monitor circuits indicate a consecutive predetermined address area in the memory,
   wherein the semiconductor device further comprises:
   a task activation control pointer for setting a head address of the consecutive predetermined address area; and
   a task activation condition setting register for setting address information indicating a range of the consecutive predetermined address area, and
   wherein, when the address signals detected by the access monitor circuit indicate an entirety of the consecutive predetermined address area determined based on the head address and the address information, the real-time schedule unit determines that input data required by an associated one of the plurality of tasks has been determined, and
   wherein the real-time schedule unit monitors whether input data for each of the plurality of tasks has been determined, and execute the associated one of the plurality of tasks that is determined that input data corresponding to the associated one of the plurality of tasks has been determined.

2. The semiconductor device according to claim 1, further comprising:
   a plurality of task activation control pointers corresponding to the plurality of tasks; and
   a plurality of task activation condition setting registers corresponding to the plurality of tasks.

3. The semiconductor device according to claim 2, further comprising:
   a task pause condition setting register that sets a threshold value for pausing a task of the plurality of tasks,
   wherein the real-time schedule unit temporarily stops a first task of the plurality of tasks when an address area of the memory which is not read based on a second task of the plurality of tasks exceeds the threshold value stored in the task pause condition setting register in an address area of the memory is written based on the first task.

4. The semiconductor device according to claim 2, wherein when a size of the input data is less than a size of the consecutive predetermined address area;
   data constituting the input data and end information are stored in the consecutive predetermined address area; and
   the real-time schedule unit determines, upon detecting the end information, that the input data for the associated one of the tasks has been determined.

5. The semiconductor device according to claim 2, wherein when a size of the input data is less than a size of the consecutive predetermined address area, data constituting the input data and predetermined information are stored in the consecutive predetermined address area.

6. The semiconductor device according to claim 2, wherein when a size of the input data exceeds the consecutive predetermined address area, the input data is divided such that the size of the input data does not exceed the consecutive predetermined address area.

7. The semiconductor device according to claim 1, further comprising:
   a transfer information obtaining circuit for obtaining the number of cycles accessing the slave from each of the plurality of masters,
   wherein the real-time schedule unit changes or/and performs scheduling access routes between the plurality of masters and the slave based on the number of cycles obtained by the transfer information obtaining circuit so that timing constraints are satisfied when there are the timing constraints for performing tasks.

8. A semiconductor device, comprising:
   a first master and a second master each performing a first task and a second task following the first task; and a real-time schedule unit connected to the first master and the second master and controlling the first master and the second master to perform the first task and the second task in real time, wherein the real-time schedule unit monitors whether input data for the second task as an execution result of the first task has been determined, wherein when the real-time schedule unit detects that a predetermined data size of the input data has been determined, the real-time schedule unit allocates the second task to at least one of the first master and the second master, wherein the first master performs the first task to generate the input data including first input data and second input data, and wherein when the real-time schedule unit detects the first input data has been determined, the real-time schedule unit allocates the second task corresponding to the first input data to at least one of the first master and the second master.

9. The semiconductor device according to claim 8, wherein a data size of the input data for the second task is larger than a predetermined data size.

10. The semiconductor device according to claim 9, wherein the real-time schedule unit allocates the first task to the other one of the first master and the second master.

11. A semiconductor device comprising:
a plurality of masters; and
a real-time schedule unit coupled to the plurality of masters and controlling the plurality of masters to perform a plurality of tasks,
wherein the real-time schedule unit monitors whether input data for each of the plurality of tasks has been determined, and executes a task of the plurality of tasks determined to have the input data,
wherein the semiconductor device further comprises:
a slave; and
a transfer information obtaining circuit for obtaining the number of cycles accessing the slave from each of the plurality of masters, and
wherein the real-time schedule unit changes or/and performs scheduling access routes between the plurality of masters and the slave based on the number of cycles obtained by the transfer information obtaining circuit so that timing constraints are satisfied when there are the timing constraints for performing tasks.

* * * * *